US012706866B2

(12) United States Patent
Ratcliff et al.

(10) Patent No.: US 12,706,866 B2

(45) Date of Patent: Aug. 11, 2026

(54) RECEIVE PROCESSING IN COMMUNICATIONS BETWEEN COMPUTING DEVICE(S) AND A NETWORK INTERFACE CARD

(71) Applicant: INTERNATIONAL BUSINESS MACHINES CORPORATION, Armonk, NY (US)

(72) Inventors: Bruce Ratcliff, Red Hook, NY (US); Stephen R. Valley, Valatie, NY (US); Patricia G. Driever, Poughkeepsie, NY (US); Dan Vangor, Mahopac, NY (US); Jerry Stevens, Raleigh, NC (US); Richard P. Tarcza, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 18/791,653

(22) Filed: Aug. 1, 2024

(65) Prior Publication Data

US 2026/0039608 A1 Feb. 5, 2026

(51) Int. Cl.
*H04L 49/90* (2022.01)
*H04L 49/901* (2022.01)

(52) U.S. Cl.
CPC ........ *H04L 49/9068* (2013.01); *H04L 49/901* (2013.01)

(58) Field of Classification Search
None
See application file for complete search history.

(56) References Cited

U.S. PATENT DOCUMENTS 4,458,316 A 7/1984 Fry et al.
5,444,853 A 8/1995 Lentz
(Continued)

FOREIGN PATENT DOCUMENTS

CN 103440171 B 8/2016
CN 103559045 B 5/2017
(Continued)

OTHER PUBLICATIONS

Anonymous: "z/OS Communications Server 2.5—IP Configuration Guide—Chapters 1, 2", Jun. 26, 2023, 124 pages, URL: https://www.ibm.com/docs/en/SSLTBW_2.5.0/pdf/halz002_v2r5.pdf.
(Continued)

*Primary Examiner* — June Sison
(74) *Attorney, Agent, or Firm* — Teddi Maranzano, Esq.; Blanche E. Schiller, Esq.; Heslin Rothenberg Farley & Mesiti P.C.

(57) ABSTRACT

An adapter module executing on a computing device of a computing environment is to be used to transmit packets from a network interface card of the computing environment to a control program executing within the computing environment. The adapter module obtains packet information of a packet received at the network interface card. Based on obtaining the packet information, a packet completion queue entry is generated in a packet completion queue and the packet information is stored in the packet completion queue entry. The packet information is to be used to locate a data buffer into which the packet is stored. The packet completion queue entry is provided to the control program to be used by the control program to retrieve the packet from the data buffer.

25 Claims, 15 Drawing Sheets

(56) References Cited

U.S. PATENT DOCUMENTS

| | | | | |
|---|---|---|---|---|
| 5,768,621 | A | 6/1998 | Young | |
| 5,901,291 | A | 5/1999 | Feeney et al. | |
| 6,006,292 | A | 12/1999 | Young | |
| 6,263,388 | B1 | 7/2001 | Cromer et al. | |
| 6,446,150 | B1 | 9/2002 | Morger et al. | |
| 6,519,645 | B2 | 2/2003 | Markos et al. | |
| 6,609,161 | B1 | 8/2003 | Young | |
| 7,089,457 | B2 | 8/2006 | Stevens | |
| 8,055,817 | B2 | 11/2011 | Higgs et al. | |
| 8,196,139 | B2 | 6/2012 | Easton et al. | |
| 8,271,258 | B2 | 9/2012 | Chan et al. | |
| 8,819,393 | B2 | 8/2014 | Blandy et al. | |
| 8,918,559 | B2 | 12/2014 | Amann et al. | |
| 9,154,368 | B2 | 10/2015 | Meyer et al. | |
| 10,686,749 | B2 | 6/2020 | Ji et al. | |
| 11,095,758 | B2 | 8/2021 | Masputra et al. | |
| 11,537,432 | B2 | 12/2022 | Khan et al. | |
| 11,765,080 | B2 | 9/2023 | Brar et al. | |
| 11,876,773 | B2 | 1/2024 | Jiang et al. | |
| 11,979,459 | B1 * | 5/2024 | Ratcliff | H04L 67/1095 |
| 2003/0023786 | A1 | 1/2003 | Craddock et al. | |
| 2004/0078480 | A1 * | 4/2004 | Boucher | H04L 47/193 709/250 |
| 2004/0249957 | A1 | 12/2004 | Ekis et al. | |
| 2005/0080869 | A1 * | 4/2005 | Bender | H04L 9/40 709/212 |
| 2006/0215670 | A1 | 9/2006 | Sampath et al. | |
| 2007/0253430 | A1 | 11/2007 | Minami et al. | |
| 2011/0106990 | A1 * | 5/2011 | Higgs | G06F 13/385 710/73 |
| 2011/0173615 | A1 * | 7/2011 | Easton | H04L 65/70 718/1 |
| 2011/0179416 | A1 | 7/2011 | Patale et al. | |
| 2015/0019781 | A1 | 1/2015 | Gomes | |
| 2018/0011635 | A1 | 1/2018 | Shin | |
| 2018/0267919 | A1 * | 9/2018 | Burstein | G06F 13/4027 |
| 2019/0303159 | A1 | 10/2019 | Fryman et al. | |
| 2020/0042479 | A1 | 2/2020 | Wang et al. | |
| 2023/0030241 | A1 | 2/2023 | Driever et al. | |
| 2023/0031131 | A1 | 2/2023 | Ryu et al. | |
| 2023/0370382 | A1 | 11/2023 | Wijnands et al. | |
| 2025/0030649 | A1 * | 1/2025 | Moshe | H04L 47/34 |
| 2025/0112968 | A1 | 4/2025 | Ratcliff et al. | |
| 2025/0123871 | A1 * | 4/2025 | Ratcliff | G06F 9/545 |
| 2025/0260596 | A1 | 8/2025 | Rao | |

FOREIGN PATENT DOCUMENTS

| | | | |
|---|---|---|---|
| CN | 107729050 | A | 1/2021 |
| CN | 111008100 | B | 9/2021 |
| CN | 117707651 | A | 3/2024 |
| JP | S61122756 | A | 6/1986 |
| KR | 100324126 | B1 | 2/2002 |
| KR | 100919273 | B1 | 9/2009 |
| WO | 2026/027348 | A1 | 2/2026 |
| WO | 2026/027350 | A1 | 2/2026 |
| WO | 2026/027353 | A1 | 2/2026 |

OTHER PUBLICATIONS

International Searching Authority, "Notification of Transmittal of the International Search Report and the Written Opinion of the International Searching Authority, or Declaration," Patent Cooperation Treaty, Oct. 23, 2025, 13 pages, International Application No. PCT/EP2025/071071.

International Searching Authority, "Notification of Transmittal of the International Search Report and the Written Opinion of the International Searching Authority, or Declaration," Patent Cooperation Treaty, Oct. 27, 2025, 14 pages, International Application No. PCT/EP2025/071055.

International Searching Authority, "Notification of Transmittal of the International Search Report and the Written Opinion of the International Searching Authority, or Declaration," Patent Cooperation Treaty, Oct. 15, 2025, 13 pages, International Application No. PCT/EP2025/071048.

Anonymous, "Denying the Address Resolution Protocol ARP Reply in Response to an ARP Request," IP.com No. IPCOM000155829D, Jul. 20, 2007, pp. 1-2 (+ cover).

Anonymous, "Method of Avoiding ARP in a Cloud Network," IP.com No. IPCOM000248946D, Jan. 24, 2017, pp. 1-8 (+ cover).

Anonymous, "Method to Eliminate Network Packet Loss During Live Kernel Update Blackout Time Through Use of a Service Proxy," IP.com No. IPCOM000256682D, Dec. 19, 2018, pp. 1-5 (+ cover).

Intel, "Intel Ethernet Controller I210 Datasheet—Revision Number 3.7," Order No. 333016-011, Jan. 2021, pp. 1-870.

Venkateswaran, R. et al., "Improved VC-Merging for Multiway Communications in ATM Networks," Proceedings 7th International Conference on Computer Communications and Networks, Nov. 1998, pp. 1-8.

Cisco Inc., "IP Addressing: ARP Configuration Guide, Cisco IOS XE Release 3S," 2020 (no further date information available), https://www.cisco.com > xe-3s >arp-xe-3s-book, pp. 1-18.

Shashidhara, Rajath et al., "FlexTOE: Flexible TCP Offload with Fine-Grained Parallelism," Symposium on Network System Design and Implementation, Oct. 2021, pp. 1-16.

Langlet, Jonatan, "Offloading Virtual Network Functions—Hierarchical Approach," Karlstads Universitet, Jun. 2020, pp. 1-82.

Carstens, Juergen, "ARP Snooping," IP.com No. IPCOM000174693D, Oct. 2008, pp. 1-2 (+ cover).

Alfredsson, Rebecka, "Multipath Transport Protocol Offloading," Karlstads Universitet, Jun. 2022, pp. 1-69.

Anonymous, "Method for Avoiding ARP in a Cloud Network," IP.com No. IPCOM000248946D, Jan. 2017, pp. 1-8 (+ cover).

Anonymous, "Efficient Address Resolution in DOVE Network," IP.com No. IPCOM000236018D, Apr. 2014, pp. 1-2 (+ cover).

ETSI, "Interface Between the Control Plane and the User Plane Nodes," Nov. 2020, pp. 1-317.

IBM, "z/Architecture Principles of Operation," IBM Publication No. SA22-7832-13, Fourteenth Edition, May 2022, pp. 1-2124.

Ratcliff, Bruce et al., "Address Resolution Protocol Processing Used In Communications Within a Computing Environment," U.S. Appl. No. 18/791,690, filed Aug. 1, 2024, pp. 1-128.

Ratcliff, Bruce et al., "Instructions Used In Communications Between Computing Device(s) and a Shared Adapter," U.S. Appl. No. 18/791,721, filed Aug. 1, 2024, pp. 1-129.

Ratcliff, Bruce et al., "Data Constructs for a Shared Network Adapter," U.S. Appl. No. 18/478,070, filed Sep. 29, 2023, pp. 1-36.

List of IBM Patents or Patent Applications Treated as Related, dated Sep. 24, 2 pages.

* cited by examiner

TRANSMIT DATA PLANE CONTROL PROGRAM QUEUE INDEX 900

| INITIATIVE STATE (910) | TX SBPE INDEX (920) |
|---|---|
| COMPLETED SBPE INDEX (930) | |

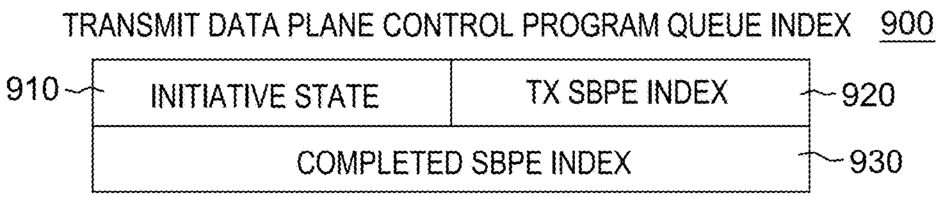

FIG. 9

RECEIVE DATA PLANE CONTROL PROGRAM QUEUE INDEX 1000

| INITIATIVE STATE (1010) | RX DATA BUFFER SBPE INDEX (1020) |
|---|---|
| PACKET COMPLETION QUEUE ENTRY SBPE INDEX (1030) | |

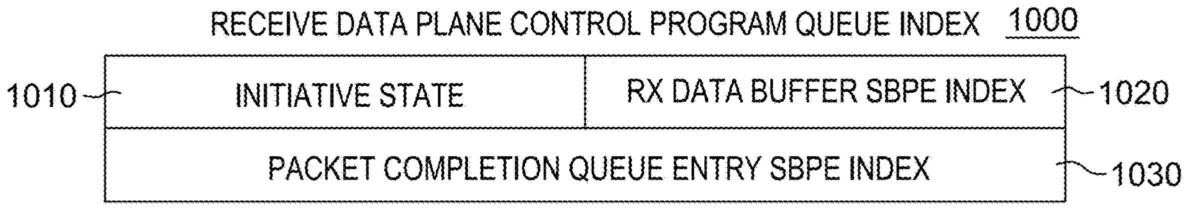

FIG. 10

RECEIVE DATA PLANE ADAPTER QUEUE INDEX 1100

| DATA SBPE INDEX (1110) |
|---|
| PACKET COMPLETION QUEUE ENTRY SBPE INDEX (1120) |

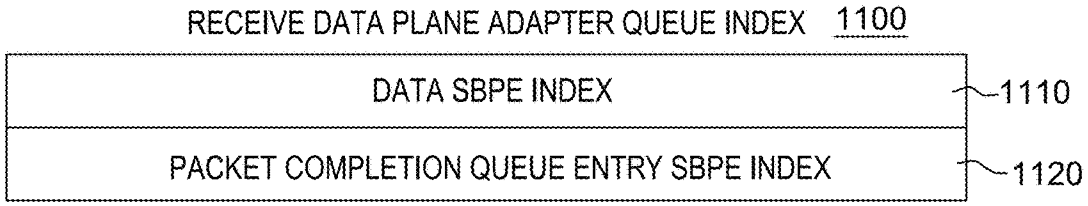

FIG. 11A

TRANSMIT DATA PLANE ADAPTER QUEUE INDEX 1150

| ADAPTER SBPE INDEX (1152) |
|---|

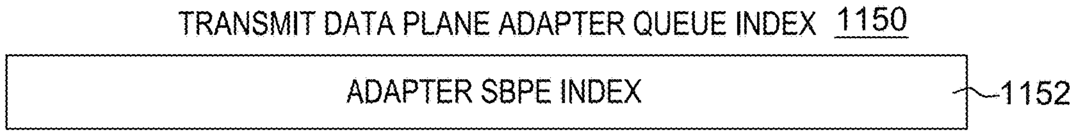

FIG. 11B

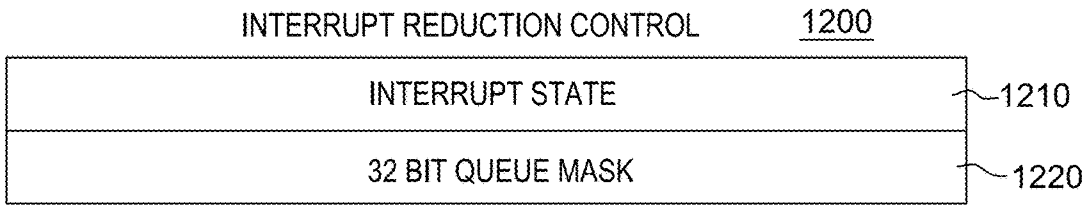

FIG. 12

RECEIVE PROCESSING IN COMMUNICATIONS BETWEEN COMPUTING DEVICE(S) AND A NETWORK INTERFACE CARD

BACKGROUND

One or more aspects relate, in general, to communications within a computing environment, and in particular, to communications between control programs executing on one or more computing devices of the computing environment and a network interface card of the computing environment.

There are different types of computing environments, including, but not limited to, a shared resource environment. A shared resource environment enables workloads executing within the environment, even those of different customers or different control programs, to be consolidated on one machine allowing the resources of that machine to be shared.

One example of a shared resource of a shared resource environment is a network interface card, which facilitates communications between input/output (I/O) devices and one or more control programs executing within the shared resource environment. The shared network interface card facilitates the transfer of data, including large amounts of data, into or out of a control program and the control program's file system. It also facilitates the streaming of other types of large data, such as video or complex engineering or scientific graphics. Transferring large amounts of data, whether it be files, streams, or other data, can be very expensive in terms of central processing unit (CPU) cycles and the cost of the network input/output (I/O).

SUMMARY

Shortcomings of the prior art are overcome, and additional advantages are provided through the provision of a computer-implemented method. The computer-implemented method includes executing an adapter module on a computing device of a computing environment. The adapter module is to be used to transmit packets from a network interface card of the computing environment to a control program executing within the computing environment. The adapter module executing on the computing device obtains packet information of a packet received at the network interface card. Based on obtaining the packet information, a packet completion queue entry is generated in a packet completion queue and the packet completion queue entry is to include the packet information. The packet information is stored in the packet completion queue entry and is to be used to locate a data buffer into which the packet is stored. The packet completion queue entry is provided to the control program to be used by the control program to retrieve the packet from the data buffer.

In one aspect, a computer-implemented method is provided. The computer-implemented method includes executing a control program on a computing device of a computing environment. The control program is to receive packets transmitted from a network interface card of the computing environment. The control program obtains packet information from a packet completion queue entry of a packet completion queue. The packet completion queue entry was generated by an adapter module executing within the computing environment and the packet information is to be used to locate a data buffer into which the packet is stored by the network interface card. The control program receives the packet transmitted from the network interface card. The receiving includes locating the packet in the data buffer using the packet information and consuming the packet from the data buffer.

Computer-implemented methods, computer systems and computer program products relating to one or more aspects are described and claimed herein. Each of the embodiments of the computer-implemented method may be embodiments of each computer system and/or each computer program product and vice-versa. Further, each of the embodiments is separable and optional from one another. Moreover, embodiments may be combined with one another. Each of the embodiments of the computer-implemented method may be combinable with aspects and/or embodiments of each computer system and/or computer program product, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 9 depicts one example of a transmit data plane control program (CP) queue index, in accordance with one or more aspects of the present disclosure;

FIG. 10 depicts one example of a receive data plane control program queue index, in accordance with one or more aspects of the present disclosure;

FIG. 11A depicts one example of a receive data plane adapter queue index, in accordance with one or more aspects of the present disclosure;

FIG. 11B depicts one example of a transmit data plane adapter queue index, in accordance with one or more aspects of the present disclosure;

FIG. 12 depicts one example of a format of an interrupt reduction control, in accordance with one or more aspects of the present disclosure;

DETAILED DESCRIPTION

Figure 1:
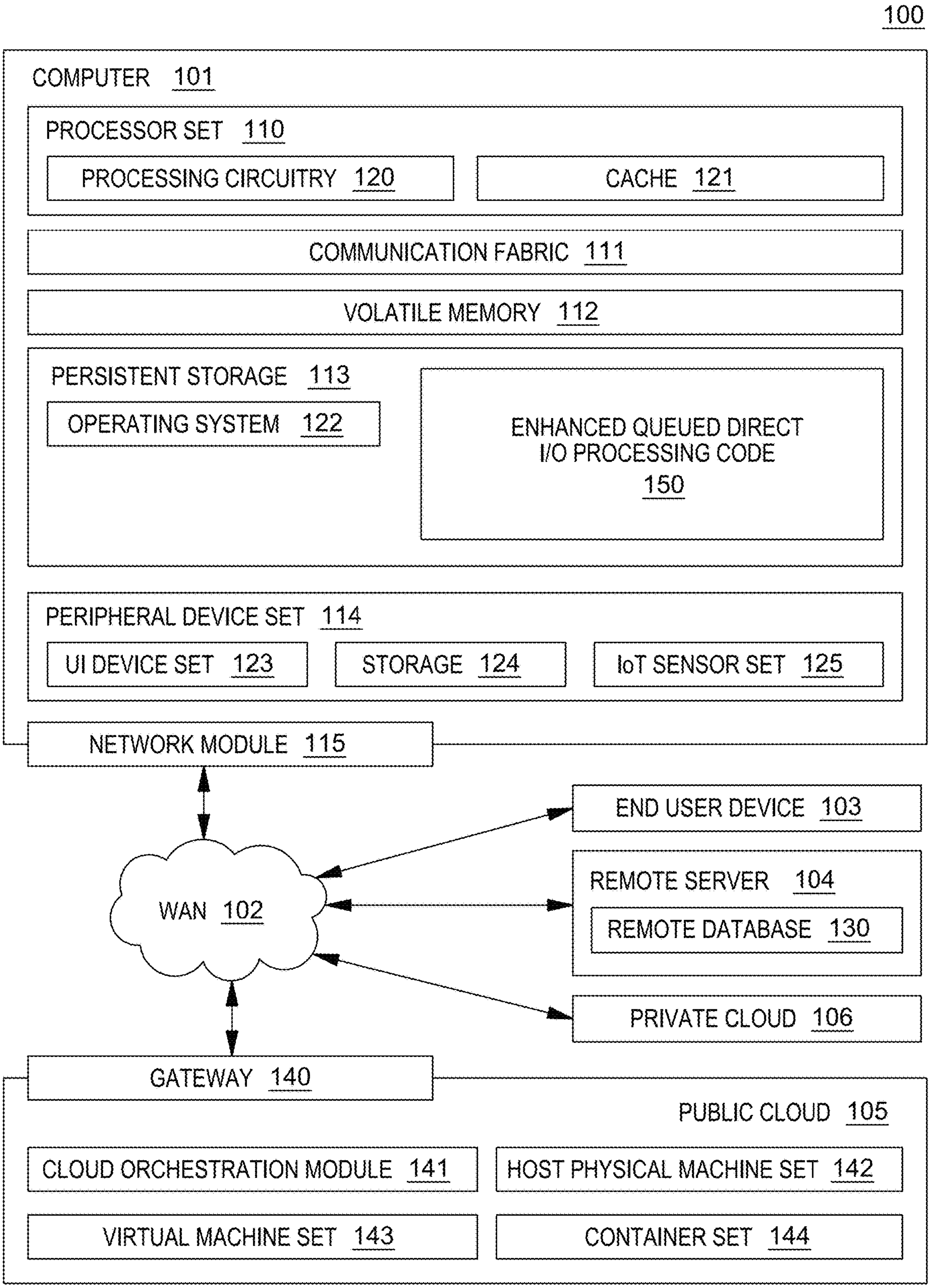
FIG. 1 depicts one example of a computing environment to incorporate and use one or more aspects of the present disclosure.

In accordance with one or more aspects of the present disclosure, a capability is provided to facilitate processing within a computing environment. For instance, communications between at least one control program (CP) executing on one or more computing devices and a network interface card (NIC) coupled thereto are facilitated and improved. As examples, a control program is an operating system, a host, other types of control programs, etc.; and the network interface card may be referred to as a network interface controller.

In one or more aspects, to facilitate communications, a packet completion queue is used to indicate to a control program where data (e.g., a packet) is stored by the network interface card for retrieval by the control program. The packet completion queue is used to locate, for instance, an area within a buffer, referred to herein as a stride, in which the data has been placed. This enables the buffer to be used until the buffer is full.

In one or more aspects, a computer-implemented method is provided. The computer-implemented method includes executing an adapter module on a computing device of a computing environment. The adapter module is to be used to transmit packets from a network interface card of the computing environment to a control program executing within the computing environment. The adapter module executing on the computing device obtains packet information of a packet received at the network interface card. Based on obtaining the packet information, a packet completion queue entry is generated in a packet completion queue and the packet completion queue entry is to include the packet information. The packet information is stored in the packet completion queue entry and is to be used to locate a data buffer into which the packet is stored. The packet completion queue entry is provided to the control program to be used by the control program to retrieve the packet from the data buffer. Communication between one or more control programs and a network interface card is facilitated through use of an adapter module and one or more queues used in receiving packets transmitted by the network interface card. In one or more aspects, these queues provide the ability for both the program (e.g., control program) and the shared adapter (e.g., adapter module) to directly communicate with each other in an asynchronous manner that is both predictable and efficient without requiring the services of a centralized controlling mechanism, such as a control program input/output supervisor, and the resulting overhead such a control mechanism implies.

Additionally, or alternatively, in one example, the data buffer is owned by the adapter module and is available for packet consumption by the control program. The data buffer is shared by the adapter module and the control program. This enables a partially used buffer to be accessed for packets, saving storage and improving performance.

Additionally, or alternatively, in one example, the data buffer includes a plurality of strides. Based on a stride of the plurality of strides being available, the data buffer continues to have packets stored therein. A buffer continues to be used as long as there are available strides, saving on storage and latency in receiving the packets.

Additionally, or alternatively, in one example, the data buffer is owned by the adapter module and shared by the adapter module and the control program. Based on consumption of the packet in a last stride of the plurality of strides, sharing of the data buffer ceases. This allows a new buffer to be used to facilitate receipt of packets transmitted from a network interface card.

Additionally, or alternatively, in one example, the packet within the data buffer is aligned on a cache line boundary. This improves performance by adhering to cache coherency.

Additionally, or alternatively, in one example, the packet completion queue corresponds to a receive data queue. The receive data queue indicates the data buffer storing the packet. This facilitates providing an indication of where a packet is stored for consumption by a control program.

Additionally, or alternatively, in one example, an indication that additional buffers are to be allocated is obtained by the adapter module. This facilitates processing by enabling additional packets to be received.

Additionally, or alternatively, in one example, the indication is included in a data structure component accessible to the adapter module. This facilitates access to the indication, improving performance and redundancy latency.

Additionally, or alternatively, in one example, an indication that the control program retrieved the packet from the data buffer is obtained by the adapter module. This facilitates processing by providing the adapter module with information that may streamline processing.

Additionally, or alternatively, in one example, the arrival of the packet in the data buffer is signaled by the adapter module to the control program. This improves processing by not requiring polling by the control program.

In accordance with one or more aspects, each of the embodiments is separable and optional from one another. Further, embodiments may be combined with one another.

In one or more aspects, a computer system is provided. The computer system includes at least one computing device, a set of one or more computer-readable storage media, and program instructions, collectively stored in the set of one or more computer-readable storage media, for causing the at least one computing device to perform computer operations. The computer operations include executing an adapter module on a computing device. The adapter module to be used to transmit packets from a network interface card to a control program executing within the computer system. The adapter module executing on the computing device obtains packet information of a packet received at the network interface card. Based on obtaining the packet information, a packet completion queue entry is generated in a packet completion queue and the packet completion queue entry is to include the packet information. The packet information is stored in the packet completion queue entry and is to be used to locate a data buffer into which the packet is stored. The packet completion queue entry is provided to the control program to be used by the control program to retrieve the packet from the data buffer. Communication between one or more control programs and a network interface card is facilitated through use of an adapter module and one or more queues used in receiving packets transmitted by the network interface card. In one or more aspects, these queues provide the ability for both the program (e.g., control program) and the shared adapter to directly communicate with each other in an asynchronous manner that is both predictable and efficient without requiring the services of a centralized controlling mechanism, such as a control program input/output supervisor, and the resulting overhead such a control mechanism implies.

Additionally, or alternatively, in one example, the data buffer includes a plurality of strides. Based on a stride of the plurality of strides being available, the data buffer continues to have packets stored therein. A buffer continues to be used as long as there are available strides, saving on storage and latency in receiving the packets.

Additionally, or alternatively, in one example, the data buffer is owned by the adapter module and shared by the adapter module and the control program. Based on consumption of the packet in a last stride of the plurality of strides, sharing of the data buffer ceases. This allows a new buffer to be used to facilitate receipt of packets transmitted from a network interface card.

Additionally, or alternatively, in one example, the packet completion queue corresponds to a receive data queue. The receive data queue indicates the data buffer storing the packet. This facilitates providing an indication of where a packet is stored for consumption by a control program.

Additionally, or alternatively, in one example, an indication that the control program retrieved the packet from the data buffer is obtained by the adapter module. This facilitates processing by providing the adapter module with information that may streamline processing.

Additionally, or alternatively, in one example, the arrival of the packet in the data buffer is signaled by the adapter module to the control program. This improves processing by not requiring polling by the control program.

In accordance with one or more aspects, each of the embodiments is separable and optional from one another. Further, embodiments may be combined with one another.

In one or more aspects, computer program product is provided. The computer program product includes a set of one or more computer-readable storage media and program instructions, collectively stored in the set of one or more computer-readable storage media, for causing at least one computing device to perform computer operations. The computer operations include executing an adapter module on a computing device of a computing environment. The adapter module is to be used to transmit packets from a network interface card of the computing environment to a control program executing within the computing environment. The adapter module executing on the computing device obtains packet information of a packet received at the network interface card. Based on obtaining the packet information, a packet completion queue entry is generated in a packet completion queue and the packet completion queue entry is to include the packet information. The packet information is stored in the packet completion queue entry and is to be used to locate a data buffer into which the packet is stored. The packet completion queue entry is provided to the control program to be used by the control program to retrieve the packet from the data buffer. Communication between one or more control programs and a network interface card is facilitated through use of an adapter module and one or more queues used in receiving packets transmitted by the network interface card. In one or more aspects, these queues provide the ability for both the program (e.g., control program) and the shared adapter to directly communicate with each other in an asynchronous manner that is both predictable and efficient without requiring the services of a centralized controlling mechanism, such as a control program input/output supervisor, and the resulting overhead such a control mechanism implies.

Additionally, or alternatively, in one example, the data buffer includes a plurality of strides. Based on a stride of the plurality of strides being available, the data buffer continues to have packets stored therein. A buffer continues to be used as long as there are available strides, saving on storage and latency in receiving the packets.

Additionally, or alternatively, in one example, the data buffer is owned by the adapter module and shared by the adapter module and the control program. Based on consumption of the packet in a last stride of the plurality of strides, sharing of the data buffer ceases. This allows a new buffer to be used to facilitate receipt of packets transmitted from a network interface card.

Additionally, or alternatively, in one example, the packet completion queue corresponds to a receive data queue. The receive data queue indicates the data buffer storing the packet. This facilitates providing an indication of where a packet is stored for consumption by a control program.

Additionally, or alternatively, in one example, an indication that the control program retrieved the packet from the data buffer is obtained by the adapter module. This facilitates processing by providing the adapter module with information that may streamline processing.

Additionally, or alternatively, in one example, the arrival of the packet in the data buffer is signaled by the adapter module to the control program. This improves processing by not requiring polling by the control program.

In one or more aspects, a computer-implemented method is provided. The computer-implemented method includes executing a control program on a computing device of a computing environment. The control program is to receive packets transmitted from a network interface card of the computing environment. The control program obtains packet information from a packet completion queue entry of a packet completion queue. The packet completion queue entry is generated by an adapter module executing within the computing environment and the packet information is to be used to locate a data buffer into which the packet is stored by the network interface card. The control program receives the packet transmitted from the network interface card. The receiving includes locating the packet in the data buffer using the packet information and consuming the packet from the data buffer. Communication between one or more control programs and a network interface card is facilitated through use of an adapter module and one or more queues used in receiving packets transmitted by the network interface card. In one or more aspects, these queues provide the ability for both the program (e.g., control program) and the shared adapter (e.g., adapter module) to directly communicate with each other in an asynchronous manner that is both predictable and efficient without requiring the services of a centralized controlling mechanism, such as a control program input/output supervisor, and the resulting overhead such a control mechanism implies.

Additionally, or alternatively, in one example, the packet information includes a starting alignment index and a receive data storage block page entry index. The starting alignment index specifies a starting location within the data buffer corresponding to the receive data storage block page entry index. This facilitates location of the packet in the buffer, improving performance.

In accordance with one or more aspects, each of the embodiments is separable and optional from one another. Further, embodiments may be combined with one another.

In one or more aspects, a computer program product is provided. The computer program product includes a set of one or more computer-readable storage media and program instructions, collectively stored in the set of one or more computer-readable storage media, for causing at least one computing device to perform computer operations. The computer operations include executing a control program on a computing device of a computing environment. The control program is to receive packets transmitted from a network interface card of the computing environment. The control program obtains packet information from a packet completion queue entry of a packet completion queue. The packet completion queue entry is generated by an adapter module executing within the computing environment and the packet information is to be used to locate a data buffer into which the packet is stored by the network interface card. The control program receives the packet transmitted from the network interface card. The receiving includes locating the packet in the data buffer using the packet information and consuming the packet from the data buffer. Communication between one or more control programs and a network interface card is facilitated through use of an adapter module and one or more queues used in receiving packets transmitted by the network interface card. In one or more aspects, these queues provide the ability for both the program (e.g., control program) and the shared adapter to directly communicate with each other in an asynchronous manner that is both predictable and efficient without requiring the services of a centralized controlling mechanism, such as a control program input/output supervisor, and the resulting overhead such a control mechanism implies.

In accordance with one or more aspects, each of the embodiments is separable and optional from one another. Further, embodiments may be combined with one another.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that performs enhanced queued direct input/output (EQDIO) processing, including receive (input) and/or transmit (output) processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as enhanced queued direct input/output (EQDIO) processing code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

Figure 2A:
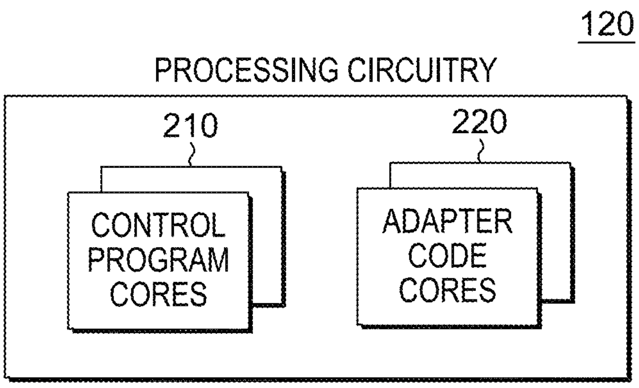
FIG. 2A depicts one example of further details of the processing circuitry of FIG. 1, in accordance with one or more aspects of the present disclosure.

In one example, processing circuitry 120 of processor set 110 includes a plurality of processor cores. For instance, as depicted in FIG. 2A, processing circuitry 120 includes one or more control program cores 210 to execute control program code and one or more adapter code cores 220 to execute adapter code of, e.g., an adapter module used in accordance with one or more aspects of the present disclosure. Control program cores 210 and adapter code cores 220 are cores of one or more processors of processor set 110. As examples, control program cores 210 and adapter code cores 220 may be cores of a same processor or cores of separate processors. Many examples are possible. In one example, one or more control program cores and one or more adapter code cores execute at least portions of enhanced queued directed I/O processing code 150.

Figure 2B:
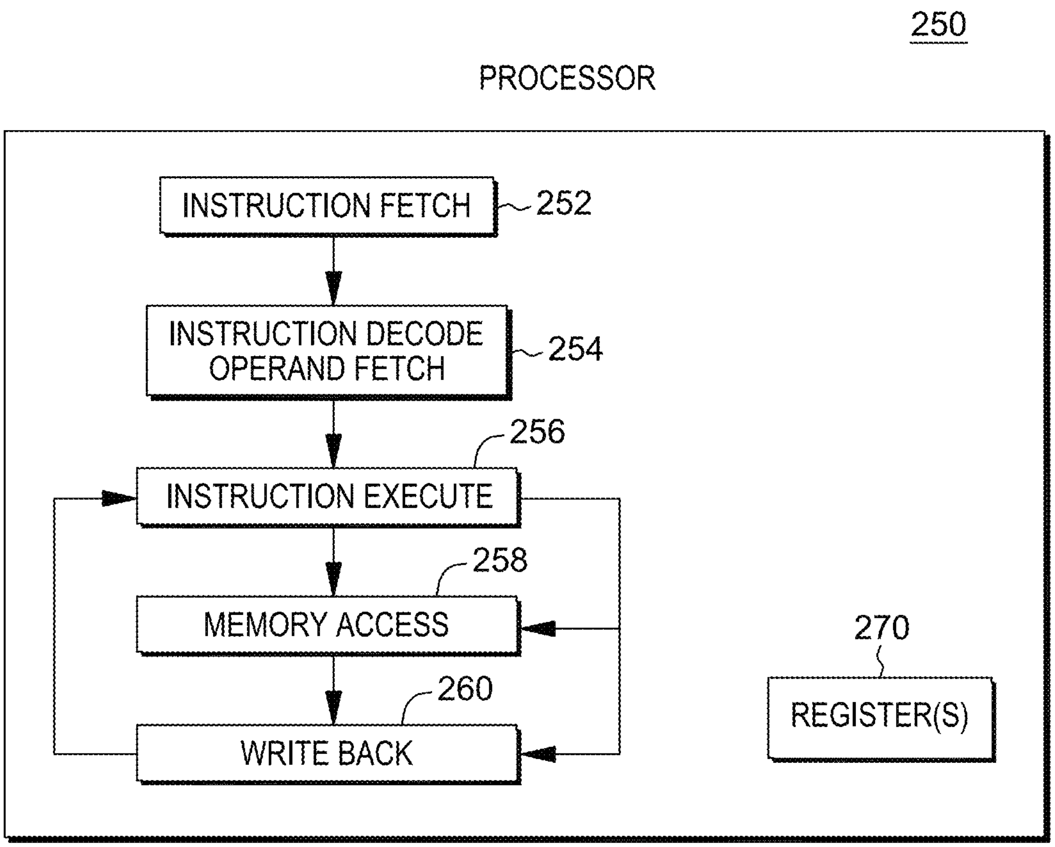
FIG. 2B depicts one example of further details of a processor of the processor set of FIG. 1, in accordance with one or more aspects of the present disclosure.

In one example, a processor (e.g., of processor set 110) includes a plurality of functional components (or a subset thereof) used to, for instance, execute instructions. As depicted in FIG. 2B, in one example, a processor 250 includes, for instance, an instruction fetch component 252 to fetch instructions to be executed; an instruction decode/operand fetch component 254 to decode the fetched instructions and to obtain operands of the decoded instructions; one or more instruction execute components 256 to execute the decoded instructions; a memory access component 258 to access memory for instruction execution, if necessary; and a write back component 260 to provide the results of the executed instructions. One or more of the components may access and/or use one or more registers 270 in instruction processing. Further, one or more of the components may access and/or use enhanced queued direct I/O processing code 150. Additional, fewer and/or other components may be used in one or more aspects of the present disclosure.

Further details of a computing environment to incorporate and use one or more aspects of the present disclosure are described with reference to FIG. 3. In one example, the computing environment is a shared resource environment 300, aspects of which are based, for instance, on the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

In one example, shared resource environment 300 includes a central processor complex (CPC) 302, having, for instance, one or more partitions or zones 304 (e.g., logical partitions (e.g., LPAR L1-LPAR L3)). Each logical partition may have a resident control program 306, which may differ for one or more of the logical partitions. That is, control program 306 may be different types of control programs. Although in this example, three logical partitions are described, other embodiments can include more or fewer logical partitions. Further, one or more of the partitions may not be executing a control program, and/or may execute control programs other than those described herein. Moreover, one logical partition can have multiple control programs. Other examples are possible.

One or more of the logical partitions are managed by a hypervisor 350, which enables the hardware to virtualize the logical partitions.

Each logical partition is coupled, in one example, to a shared adapter 310 (also referred to as a shared network adapter). In one example, shared adapter 310 includes an adapter module 311 used in communications between a network interface card (NIC) 312 (e.g., network module 115) and one or more control programs 306. Shared adapter 310 is coupled to network interface card 312. As examples, in one embodiment, shared adapter 310 includes network interface card 312 or in another embodiment, shared adapter 310 is coupled to but separate from network interface card 312. Regardless of how shared adapter 310 is coupled to network interface card 312, adapter module 311 of shared adapter 310 is coupled to network interface card 312 and facilitates communication between network interface card 312 and one or more control programs 306, in accordance with one or more aspects of the present disclosure.

In one example, network interface card 312 enables communication between an external network 314 (and/or one or more input/output devices) and one or more control programs 306. In one example, network interface card 312 is coupled to external network 314 via, e.g., a port 316. External network 314 may be used to communicate between the logical partitions of shared resource environment 300 or with computing devices of other computing environments over, e.g., a local area network (LAN), a wide area network (WAN), or any other possible networks, such as Ethernet or fibre channels, as examples.

Adapter module 311 includes, for instance, adapter code used in communications between the control programs (e.g., control programs 306) in the logical partitions (e.g., logical partitions 304) and network interface card 312. For instance, adapter module 311 provides an interface to communicate between the logical partitions and other components (e.g., network interface card 312) of shared adapter 310. In one example, the adapter code is stored in memory owned by the adapter module or the shared adapter and is executed by one or more computing devices of the central processor complex (e.g., one or more adapter code cores (e.g., adapter code cores 220) of one or more processors). As examples, the adapter code may be software code, microcode, firmware, and/or other code. Firmware includes, e.g., the microcode or milli-code of a processor. It includes, for instance, the hardware-level instructions and/or data structures used in implementation of higher-level machine code. In one embodiment, it includes, for instance, proprietary code that is typically delivered as microcode or milli-code that includes trusted software, microcode or milli-code specific to the underlying hardware and controls operating system access to the system hardware. In one example, adapter module 311 includes code, hardware and/or firmware. Various examples are possible.

In one example, the logical partitions have devices 395*a*-395*d* (also referred to as a device 395 or devices 395), which serve as interfaces between a respective control program in the logical partitions and shared adapter 310. While FIG. 3 depicts each logical partition as having one device 395, a logical partition (or a control program in the logical partition) may have multiple devices 395 (e.g., one device 395 dedicated to IPv4 (internet protocol version 4) traffic and another device 395 dedicated to IPv6 (internet protocol version 6) traffic). Other examples are possible.

Shared adapter 310 includes, in one example, a plurality of data connections 318, each of which is coupled to one of devices 395 within a logical partition. For instance, a data connection 318*a* is coupled to a device 395*a* in logical partition 1; data connections 318*b*, 318*c* are coupled to devices 395*b*, 395*c*, respectively, in logical partition 2; and a data connection 318*d* is coupled to a device 395*d* in logical partition 3. In one example, data connections 318 are enhanced queued direct I/O (EQDIO) data connections. Further, data connections 318 can be used to transmit both data for user applications, as well as control data.

Device 395*a* is further coupled to an entity 322*a*, such as a Transmission Control Protocol/Internet Protocol (TCP/IP) stack, a protocol stack for a selected control program in logical partition 1; devices 395*b*, 395*c* are further coupled to entities 322*b*, 322*c* (such as Guest 1, Guest 2), respectively, in logical partition 2; and device 395*d* is further coupled to a virtual switch 324 in logical partition 3. Other examples and/or variations are possible.

Virtual switch 324 enables further sharing of data among entities 326*a*, 326*b* and 326*c* (e.g., Guest 1, 2 and 3) of logical partition 3. Virtual switch 324 includes a plurality of ports 328*a*, 328*b* and 328*c*, each of which is coupled to a respective guest via, e.g., a network internet card (NIC) 330*a*, 330*b*, and 330*c*, respectively. The virtual switch allows the guests coupled thereto to communicate with one another without using the adapter or the external network.

Figure 3:
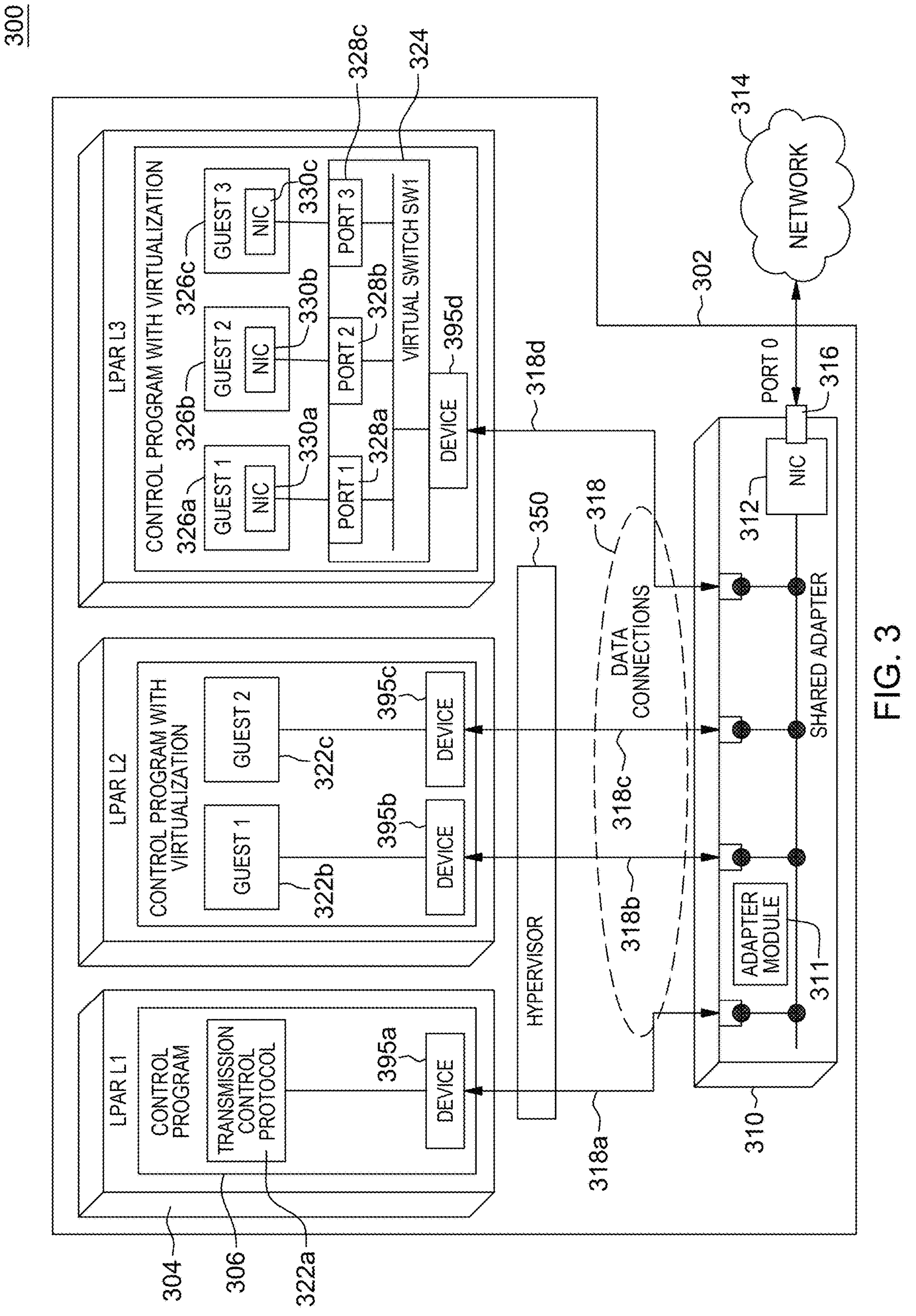
FIG. 3 depicts one example of a shared resource environment to incorporate and use one or more aspects of the present disclosure.

FIG. 3 is only one example of a computing environment to incorporate and use one or more aspects of the present disclosure. Although aspects are applied to a computing environment where multiple entities (e.g., logical partitions (LPARs) or virtual machines (VM)) share a common network interface card, other examples are possible. One or more aspects may be applied to any computing environment in which a shared resource, such as a shared network interface card or shared adapter, is used. In one example, aspects of the present disclosure may be applied to any suitable hardware system and control program(s). Other examples are possible.

Figure 4:
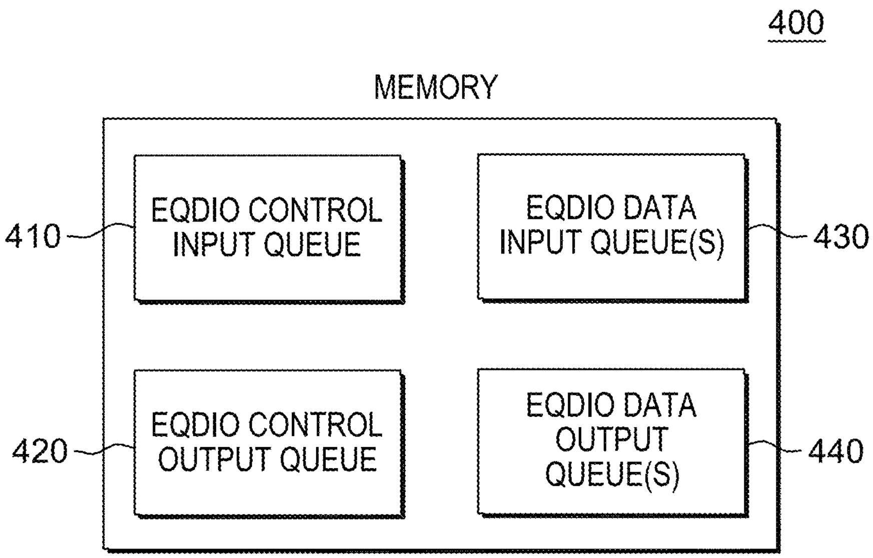
FIG. 4 depicts examples of queues to be used in communication within a computing environment, in accordance with one or more aspects of the present disclosure.

In accordance with one or more aspects, a computing environment, such as computing environment 100 and/or shared resource computing environment 300, uses an enhanced queued direct input/output (I/O) (EQDIO) facility for communicating between, for instance, computing devices (e.g., processors, etc.) and a network interface card (e.g., an Open Systems Adapter (OSA) or other network interface card). In one example, when the enhanced queued direct I/O (EQDIO) facility is provided by a computing environment (e.g., computing environment 300), a plurality of queues is configured for use in communications. For example, referring to FIG. 4, a plurality of queues is stored in memory 400 (e.g., main memory, also referred to as main storage) and includes one control input queue (e.g., EQDIO control input queue) 410 and one control output queue (e.g., EQDIO control output queue) 420 to be used for control plane operations for each EQDIO subchannel, and one or more data input queues (e.g., EQDIO data input queues) 430 and one or more data output queues (e.g., EQDIO data output queues) 440 to be used for data operations. A subchannel represents an input/output device and is used to pass I/O requests to a channel subsystem used to move data.

In one example, a minimum of 0 and a maximum of 30 data input queues (e.g., EQDO data input queues) 430 and a minimum of 0 and a maximum of 30 data output queues (e.g., EQDIO data output queues) 440 are to be provided for data plane operations. The total number of a combination of EQDIO control input queue, EQDIO control output queue, EQDIO data input queues and EQDIO data output queues is not to exceed 32, in one example. When using an EQDIO subchannel to support, for instance, a network trace analyzer function, in addition to the control queues there is to be at least 1 input data queue defined. Other examples are possible.

When EQDIO control and data input queues are provided, the program (e.g., control program) can directly access data placed into the input queues by the shared adapter (e.g., shared adapter 310). Typically, the source of the data placed into data input queues is an I/O device or a network of devices to which the network interface card of the shared adapter is connected. The source of the data placed into the control input queue is the adapter module, in one example. Correspondingly, when EQDIO control and data output queues are provided, the program (e.g., control program) transmits data directly to the shared adapter by placing data into the appropriate output queues; thereby saving resources and time. Depending on the shared adapter, the data placed into data output queues may be used internally by the shared adapter or may be transmitted to one or more I/O devices to which the shared adapter is connected. The data placed into the control output queue is used internally by the shared adapter (e.g., by the adapter module). For EQDIO queues, in one example, main storage is used as the medium by which data is exchanged between the program (e.g., control program) and the shared adapter. Additionally, these queues provide the ability for both the program (e.g., control program) and the shared adapter to directly communicate with each other in an asynchronous manner that is both predictable and efficient without requiring the services of a centralized controlling mechanism, such as a control program input/output supervisor, and the resulting overhead such a control mechanism implies.

In one example, both control input and output queues 410, 420, respectively, and data input and output queues 430, 440, respectively, are constructed in memory 400 (e.g., main memory) by a control program and are initialized and activated at an adapter module, as described herein. Each queue has a queue structure including, for instance, multiple separate queue components (also referred to as data constructs) that collectively describe the queue's characteristics and provide controls to allow the exchange of data between the control program and the adapter module.

Figure 5A:
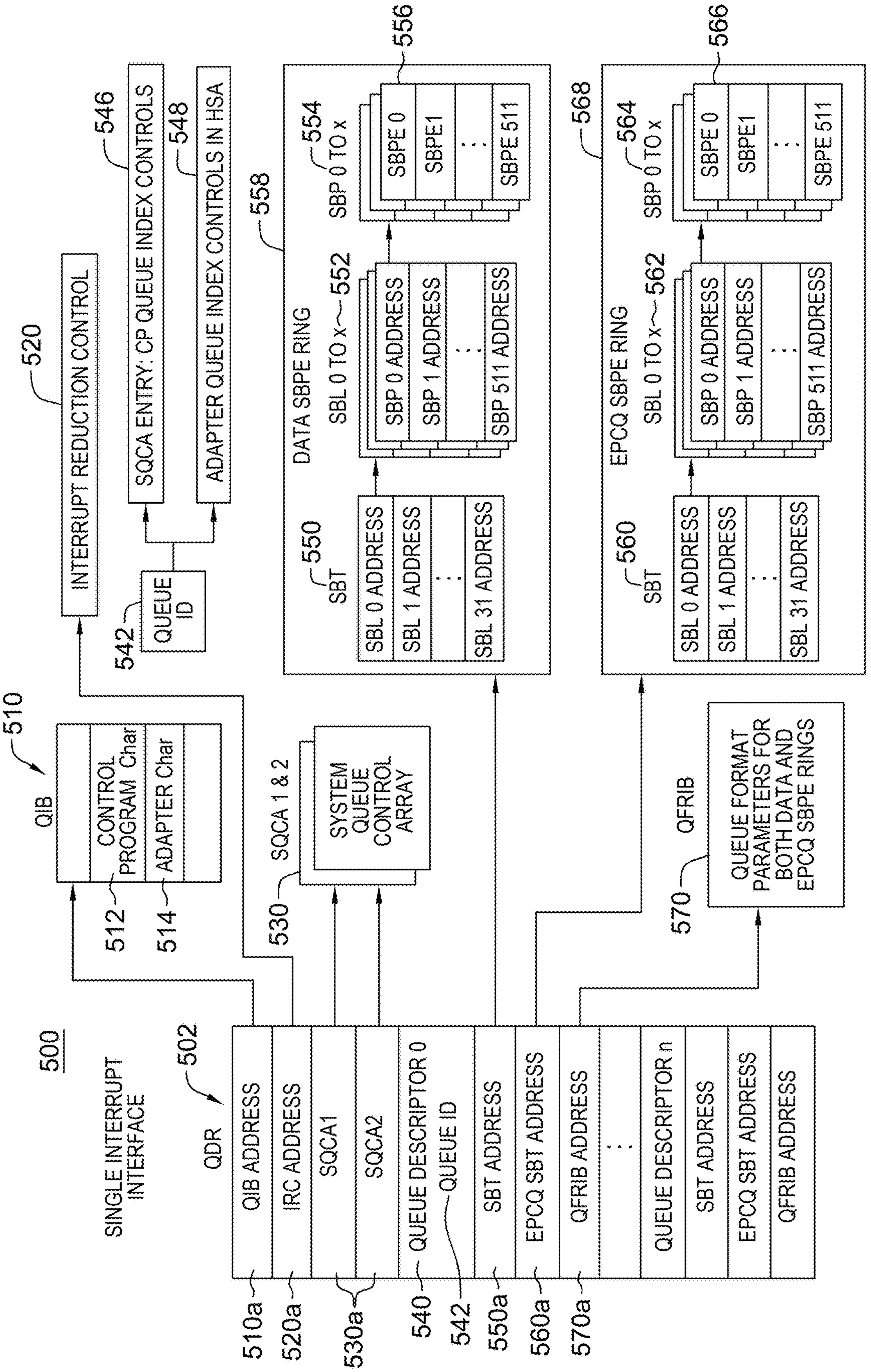
FIG. 5A depicts one example of an enhanced queued direct input/output (EQDIO) queue structure, in accordance with one or more aspects of the present disclosure.

One example of an EQDIO queue structure is described with reference to FIG. 5A. As an example, an EQDIO queue structure 500 includes:

Queue Descriptor Record (QDR) 502: In one example, one queue descriptor record is defined per EQDIO subchannel. The queue descriptor record provides information about the collection of input and output queues associated with the subchannel along with anchor pointers to other structures relevant for queue management and operations. In one example, queue descriptor record 502 includes, for instance:

Queue Information Block (QIB) Address 510*a*: In one example, queue information block address 510*a* identifies a queue information block 510. In one example, one queue information block 510 is defined per enhanced queued direct I/O subchannel. The queue information block is a control area used to exchange characteristics between the control program and the adapter module. It provides, for instance, information about control program characteristics 512 and adapter characteristics 514 (e.g., network interface card characteristics) associated with the subchannel. An address 510*a* of the queue information block is passed in queue descriptor record (QDR) 502 to the system by, for instance, execution of an Establish-QDIO-Queues Channel Command Word (CCW) of a Start Subchannel instruction. Other mechanisms may be used.

Interrupt Reduction Control (IRC) Address 520*a*: In one example, interrupt reduction control address 520*a* identifies an interrupt reduction control 520. In one example, there is one interrupt reduction control 520 defined for each EQDIO device (e.g., device 395*a-d*). Each output queue and input queue is mapped to one of the, e.g., 32 bits of an interrupt reduction control queue mask (of interrupt reduction control 520) based on a defined queue ID 542 in a queue descriptor 540 of queue descriptor record 502. The interrupt reduction control includes, for instance, an interrupt state which is used by the adapter module to indicate if an interrupt is to be performed when a queue mask update is made.

System Queue Control Array (SQCA) Addresses (SQCA1, SQCA2) 530*a*: In one example, one or more system queue control array addresses 530*a* indicate one or more system queue control arrays 530 (SQCA1 & 2). As an example, a system queue control array 530 includes up to, e.g., two 4K-pages that are 4K page-aligned within control program memory. The first page includes, for instance, control program (CP) queue index controls 546 for queue IDs 0 to 15 while the second 4K-page contains, for instance, control program (CP) queue index controls 546 for queue IDs 16 to 31. Each page, when defined, is to allocate the entire 4K of memory, in one example. Since each enhanced QDIO subchannel is to have at least one input control queue and one output control queue, the first page is to be allocated. The second page is allocated, e.g., when there are more than 16 queues defined. System queue control array 530 is allocated by the control program and is passed in the queue descriptor record to the system in execution of, e.g. an Establish-QDIO-Queues Channel Command Word (CCW) of a Start Subchannel instruction. Subsequent to the successful execution of this command, the system queue control array is no longer to be accessed directly (read or written) by the control program, in one example.

In one example, the system queue control array addresses, SQCA1 and SQCA2, are pointers to, e.g., 4K pages. Each 4K page contains an array of, e.g., 16 entries. Each system queue control array entry is, e.g., 256 bytes. There is one system queue control array entry allocated in the system queue control array for each defined EQDIO queue. During initialization, the adapter module maps the queue descriptor (described herein) in the queue descriptor record to the matching index in the system queue control array. Each system queue control array entry contains the control program queue index area associated with the specific queue type. For instance, if the queue descriptor defines the queue type as a receive data queue, the control program queue index area in the system queue control array has a receive data plane control program queue index (e.g., format shown in FIG. 10, described herein).

Queue Descriptor (QD) 540 (may also be referred to as a queue descriptor array entry): In one example, one queue descriptor 540 is defined for each EQDIO input and output (control or data) queue for a given subchannel. Each queue descriptor 540 provides a queue identifier (ID) 542, as well as information about the EQDIO queue and the main storage addresses used to access the queue contents. The maximum number of queue descriptors is 32, in one example. The queue descriptors of the queues (e.g., all the queues) associated with a subchannel are contained in queue descriptor record 502. Each queue descriptor 540 includes, in one example:

Queue Identifier (ID) 542: In one example, queue identifier 542 is used to indicate, for instance, a system queue control array entry for control program queue index controls 546 and an adapter (ADP) queue index controls 548 in, e.g., a hardware system area (HSA).

Storage Block Table (SBT) Address 550*a*: In one example, storage block table address 550*a* indicates a storage block table 550. One storage block table 550 is defined for each EQDIO queue associated with a subchannel. The storage block table has a fixed length of, e.g., 256 bytes and contains a maximum of, e.g., 32 entries, one entry for each of the possible EQDIO storage block list (SBL) 552 associated with the queue.

Storage Block List (SBL) 552: In one example, up to, e.g., 32 storage block lists are defined for each EQDIO queue associated with a subchannel. The storage block lists contain pointers to storage block pages (SBPs) 554 that contain, e.g., a contiguous allocation of storage block page entries (SBPEs) 556 associated with an EQDIO queue. A storage block list contains entries for up to, e.g., 512 storage block pages.

Storage Block Page (SBP) 554: In one example, up to, e.g., 512 storage block pages are defined, each pointing to, e.g., a contiguous list of storage block page entries (SBPEs) 556 that provide information about the I/O buffer location, configuration and state in main storage. The length of the storage block pages associated with a particular queue is set by the control program. The number of storage block page entries contained in a storage block page is variable based on the page size, the associated length of the storage block page entries defined for this EQDIO queue, and the queue type, as examples.

Storage Block Page Entry (SBPE) 556: In one example, there is one storage block page entry for each of the I/O buffers associated with an EQDIO queue. When the storage block page entry is an immediate data entry, there may be more than one entry chained together. Each entry provides addressing and state information about its associated I/O buffer. The size (length) of a storage block page entry can be variable based on the specific queue type. The queue types include, for example: control plane queue (Format 0); data plane input queue (Format 1); and data plane output queue (Format 0), as examples.

In one example, the storage block tables 550, storage block lists 552 and storage block pages 554 are part of a data storage block page entry ring 558.

Packet Completion Queue (e.g., Ethernet packet completion queue (EPCQ)) Storage Block Table Address 560*a*: In one example, a packet completion queue storage block table address 560*a* indicates a storage block table 560 of, e.g., a packet completion queue (e.g., Ethernet packet completion queue) storage block page entry ring 568. Packet completion queue storage block page entry ring 568 is a second storage block page entry ring (in addition to data storage block page entry ring 558) that is defined for receive data queues and is used to provide the network interface card with buffers and is to contain control information (also referred to herein as packet information) about each packet (e.g., Ethernet packet) placed in a data buffer. The packet information is placed in, e.g., a packet completion queue (e.g., EPCQ) storage block page entry 566 for the input queue. The packet completion queue uses, e.g., Format 2 storage block page entries 566. Each storage block page 564 of the packet completion queue is, e.g., a 4K page containing up to, e.g., 512 8-byte storage block page entries 566.

In one example, storage block table 560 includes one or more addresses to one or more storage block lists 562 that include one or more addresses to storage block pages 564, which include one or more storage block page entries 566.

In one example, an Ethernet packet completion queue is one example of a packet completion queue that may be used. Other examples are possible.

Queue Format Record Information Block (QFRIB) Address 570*a*: In one example, queue format record information block address 570*a* indicates a queue format record information block 570. As an example, one queue format record information block 570 is defined for each queue. The queue format record information block provides specific configuration information about the queues. The address of the queue format record information block is passed in queue descriptor record 502 to the system in execution of the, e.g., Establish-QDIO-Queues Channel Command Word (CCW) of a Start Subchannel instruction.

Figure 5B:
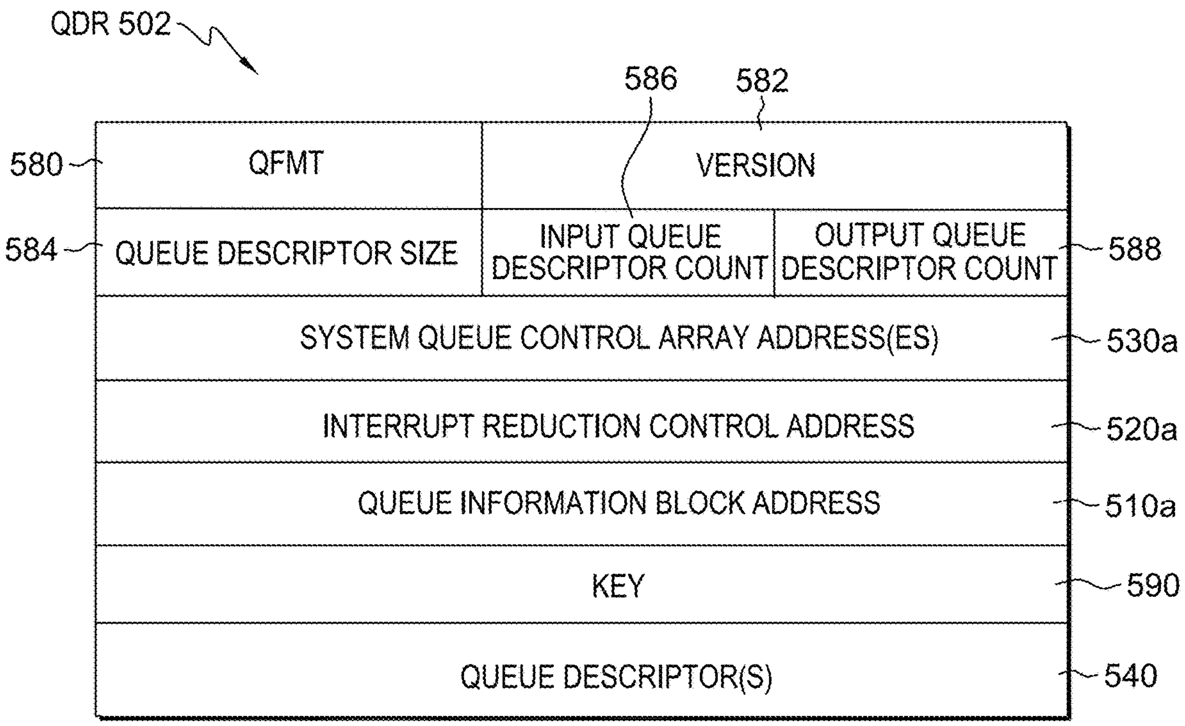
FIG. 5B depicts one example of a format of a queue descriptor record, in accordance with one or more aspects of the present disclosure.

A queue descriptor record, such as queue descriptor record 502, may include additional, fewer and/or other information. For example, as shown in FIG. 5B, in a further example, queue descriptor record 502 includes the following information, some of which is also described with reference to FIG. 5A:

Queue Format (QFMT) 580: In one example, byte 0 of word 0 of queue descriptor record 502 includes queue format 580 that enables the use of multiple protocols, each using a specific format for their storage block page entries, control program and adapter queue index areas, interrupt reduction control, etc. In one example, a value of 8 is for Open Systems Adapter (OSA) Hybrid (OSH) networking. Other examples are possible.

Version 582: In one example, byte 1 of word 0 of queue descriptor record 502 indicates the version of the queue descriptor record. It enables support for multiple versions of a specific queue format. For example, a version 2 might support an expanded format of the storage block page entries which is not supported in version 1. In one example, for Open Systems Adapter (OSA) Hybrid (OSH) networking queues this value is, e.g., 1. Other examples are possible.

Queue Descriptor Size 584: In one example, byte 1 of word 1 of queue descriptor record 502 includes the queue descriptor size. In one example, queue descriptor size 584 informs the adapter module (e.g., adapter module 311) of the size of queue descriptor 540. It includes, for instance, the total number of 4-byte words contained in a queue descriptor. The value is the same, in one example, for a given queue format value. In one example for EQDIO OSA Hybrid, this value is, e.g., 12 words in length. Other examples are possible.

Input Queue Descriptor Count 586: In one example, byte 1 of word 1 of queue descriptor record 502 is the number of input (receive) queue descriptors defined. The minimum is, for instance, 1 and the maximum is, for instance, 31. Other examples are possible.

As for input data queues, the device may include multiple receive (input) data queues which may be assigned different priorities. (As used herein, receive and input with respect to the queues and/or data constructs of the queues are used interchangeably unless specified or understood otherwise.) The control program may process the received packets differently depending on which receive queue they are in. One other use for multiple receive queues is that the control program can configure a specific receive queue for a special traffic type (e.g., address resolution protocol (ARP)), therefore enabling the control program to attach a special program specifically designed for that traffic type. Other examples are possible.

Output Queue Descriptor Count 588: In one example, byte 3 of word 1 of queue descriptor record 502 includes the number of output (transmit) queue descriptors defined. The minimum is, for instance, 1 and the maximum is, for instance, 31. Other examples are possible.

As for output data queues, the device may include multiple transmit (output) queues where each queue can have a different priority. (As used herein, transmit and output with respect to the queues and/or data constructs of the queues are used interchangeably unless specified or understood otherwise.) For example, for each pass, the adapter module may process at most, e.g., 5 packets for one transmit queue (even if it has more packets than that) but may process up to, e.g., 10 packets for another, higher priority, transmit queue in the device. Other examples are possible.

System Queue Control Array (SQCA) Address(es) 530*a*: In one example, bytes 0-3 of words 2 and 3 of queue descriptor record 502 include a system queue control array address 1 (e.g., system queue control array address 1 (530*a*)) that includes the, e.g., 64-bit absolute address of, e.g., a 4K page that is to be on, e.g., a 4K boundary within control program memory that includes the system queue control array (e.g., system queue control array 1 (530)) containing the control program queue index controls for the first, e.g., 16 queue IDs (e.g., queues 0 to 15). The input and output control planes are to be defined and thus, the system queue control array 1 is to be defined.

Further, in one example bytes 0 to 3 of words 4 and 5 include a system queue control array address 2 (e.g., system queue control array address 2 (530*a*)) that includes the, e.g., 64-bit absolute address of, e.g., a 4K page that is to be on, e.g., a 4K boundary within control program memory that includes the system queue control array (e.g., system queue control array 2 (530)) containing the control program queue index controls for the second set of, e.g., 16 queue IDs (e.g., queues 16 to 31), if defined. If none of these queue IDs are defined, then this memory does not need to be allocated and this address is set to, e.g., zero.

In one example, system queue control array address(es) 530*a* includes the address(es) for control program queue index controls 546 in control program memory. For instance, system queue control array address 530*a* includes the memory address of the control program queue index controls so that the adapter module can read the index to determine which of the transmit storage block page entries in control program memory correspond to new transmit packets. In one embodiment, each transmit queue in the device has its own set of transmit storage block page entries. As such, each transmit queue can also have its own control program queue index controls.

In one example, each system queue control array includes one or more entries (e.g., each being a 256-byte entry on, e.g., a 256-byte boundary) for one or more queues, and each entry includes, for instance, control program queue index controls (e.g., control program queue index controls 546).

Interrupt Reduction Control Address 520*a*: In one example, bytes 0 to 3 of words 6 and 7 of queue descriptor record 502 include the, e.g., 64-bit absolute address of an interrupt reduction control (e.g., interrupt reduction control 520). It is, for instance, an 8-byte field located on a 256-byte boundary that includes the interrupt status. There is, for instance, one interrupt reduction control per EQDIO device.

As an example, interrupt reduction control 520 is in, e.g., control program memory. That way, the adapter module can query this control and can interrupt the control program when there are new received packets ready for it to process, as described herein.

Queue Information Block Address 510*a*: In one example, bytes 0 to 3 of words 12 and 13 of queue descriptor record 502 include, e.g., the 64-bit absolute address of the queue information block (e.g., queue information block 510). It is used by the control program to identify any particular characteristics of the control program or the network interface card, as examples. It is, for instance, a 256-byte field located on, e.g., a 256-byte boundary containing the characteristics. There is, for instance, one queue information block per EQDIO device.

In one example, queue information block 510 may include information which is global to the queues (e.g., all the queues). This may include information like the control program and network interface card capabilities. The control program capabilities include, e.g., the cache line size. The network interface card capabilities include, for instance, protocol offloads, LAN speed, link aggregation functionality, etc.

Key 590: In one example, bits 0 to 3 of byte 0 of word 15 of queue descriptor record 502 include a storage access key to be used by the adapter module, in one example, when accessing the defined EQDIO structures for that device.

Queue Descriptor(s) 540: In one example, words 16 to 16+M of queue descriptor record 502 include queue descriptor 0; and words 16+M+1 to N−1 include queue descriptors 1 up to 31. The total number of queue descriptors is determined by the total of the input and output queues defined for the given EQDIO device. The length of each queue descriptor is dependent on, e.g., the type of EQDIO queue format. The length of each queue descriptor is defined, for instance, in the queue descriptor size field (e.g., queue descriptor size 584). In one example, for EQDIO OSA Hybrid queues, each queue descriptor is, e.g., 12 words in length. Other examples are possible.

Figure 5C:
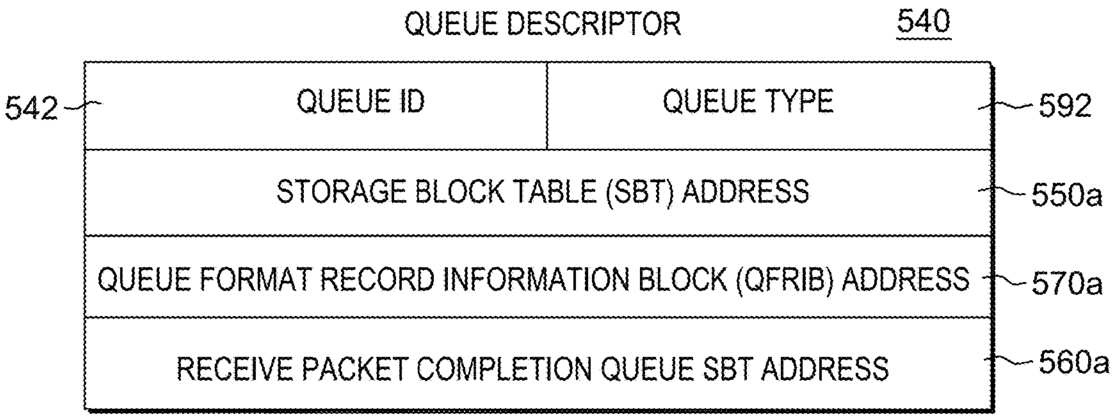
FIG. 5C depicts one example of a format of a queue descriptor of the queue descriptor record of FIG. 5B, in accordance with one or more aspects of the present disclosure.

Further details of one example of a queue descriptor are described with reference to FIG. 5C. In one example, queue descriptor 540 includes the following information, some of which is also described with reference to FIG. 5A. A queue descriptor, such as queue descriptor 540, may include additional, fewer and/or other information.

Queue ID 542: In one example, byte 0 of word 0 includes the queue ID, which is used to identify a specific queue in the device that corresponds to queue descriptor 540. This is used, for instance, to map the queue into an interrupt reduction control (e.g., interrupt reduction control 520) and is to be unique for each queue defined in the EQDIO subchannel. The queue ID is to be, e.g., 0 for a control plane input/receive (RX) queue and, e.g., 1 for a control plane output/transmit (TX) queue. Any data plane queues, if they are defined will be numbered 2 to 31 and are assigned when each queue is defined. Other examples are possible.

Queue Type 592: In one example, byte 1 of word 0 includes the queue type, which indicates whether the corresponding queue is a control queue, a receive queue, or a transmit queue, etc., as examples. In one example, for format 8 EQDIO queues, the valid values are x'01' input (receive) data plane, x'81' output (transmit) data plane, x'40' input control plane, and x'C0' output control plane. Other examples are possible.

Storage Block Table (SBT) Address 550*a*: In one example, words 2 and 3 of the queue descriptor include the storage block table address 550*a*, which is, for instance, a 64-bit absolute address pointer to the location of the data storage block lists for this queue. The address is, for instance, on a 256-byte cache line alignment and is, e.g., 256-bytes in length.

In one example, storage block table address 550*a* stores an address that maps to the locations in control program memory of the transmit storage block page entries or receive data storage block page entries corresponding to the queue. That way, the adapter module knows where in control program memory the transmit storage block page entries or receive data storage block page entries are located.

Queue Format Record Information Block (QFRIB) Address 570*a*: In one example, words 4 and 5 of the queue descriptor include the queue format record information block address, which is, for instance, a 64-bit absolute address pointer to a location of the queue format record information block for this queue. In one example, queue format record information block address 570*a* stores an address to a block (e.g., QFRIB 570) that includes specific configuration information for the transmit or receive queue type. Each queue type has its own format and includes, for instance, the storage block page entry ring parameters and queue specific parameters. Each queue format record information block is, for instance, 64-bytes in size.

In one example, an input data plane queue format record information block includes, for instance, queue type, version, queue format record information block length, queue ID, input data storage block list page size, input data total storage block list blocks, input data storage block page entry size, input data max storage block page entry index, packet completion queue (EPCQ) storage block page entry page size, max storage block page entry index, latency timer, streaming timer, block max packet count, interrupt threshold(s), etc. Other examples are possible. Different queue format record information blocks may have additional, fewer and/or other information depending on the queue type. Many examples are possible.

Receive Packet Completion Queue Storage Block Table (SBT) Address (e.g., Input EPCQ SBT address) 560*a*: In one example, words 6 and 7 of the queue descriptor include the receive packet completion queue storage block table address (e.g., input EPCQ SBT address), which is, for instance, a 64-bit absolute address pointer to the location of the receive packet completion queue storage block table for this queue when it is an input data plane queue. The address is to be on, e.g., a 256-byte cache line alignment and is, e.g., 256-bytes in length.

In one example, receive packet completion queue storage block table address 560*a* stores an address that maps to the location of the receive packet completion queue entries (e.g., receive Ethernet packet completion queue entries or other types of packet completion queue entries). That way, the adapter module knows where in control program memory the receive packet completion queue entries are located.

Figure 6A:
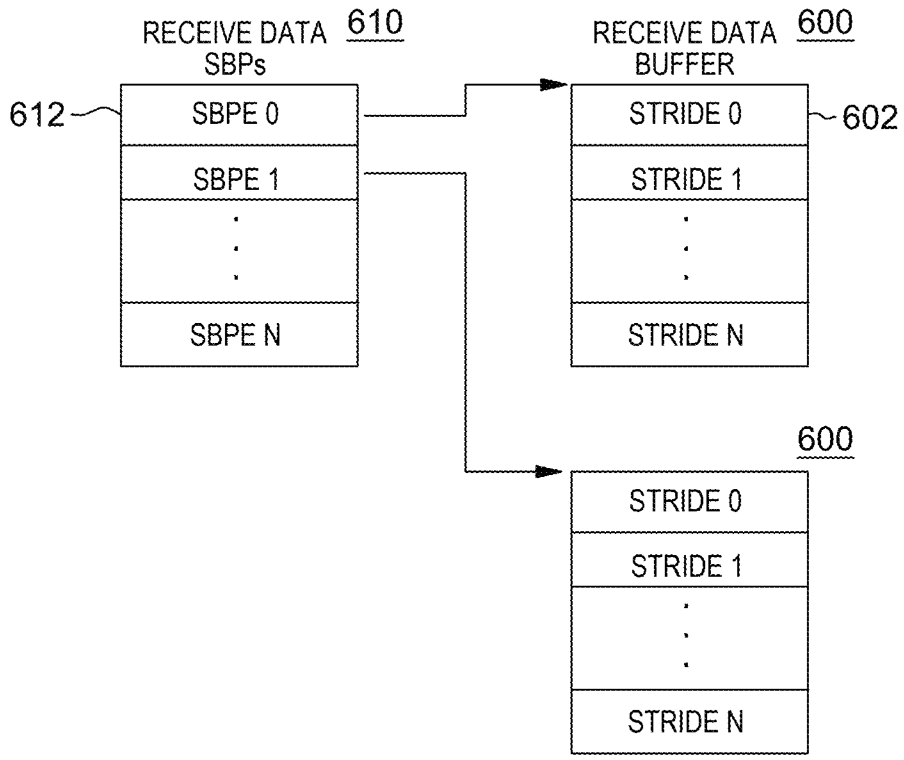
FIG. 6A depicts one example of receive data buffers, in accordance with one or more aspects of the present disclosure.

In one example, a receive packet completion queue entry is a receive packet (e.g., Ethernet packet) completion queue storage block page entry that maps locations of packets in a receive data buffer. One example of a receive data buffer is described with reference to FIG. 6A. As depicted, in one example, a receive data buffer 600 includes one or more entries or strides 602 and is pointed to by a storage block page entry 612 of a receive data storage block page 610.

Figure 6B:
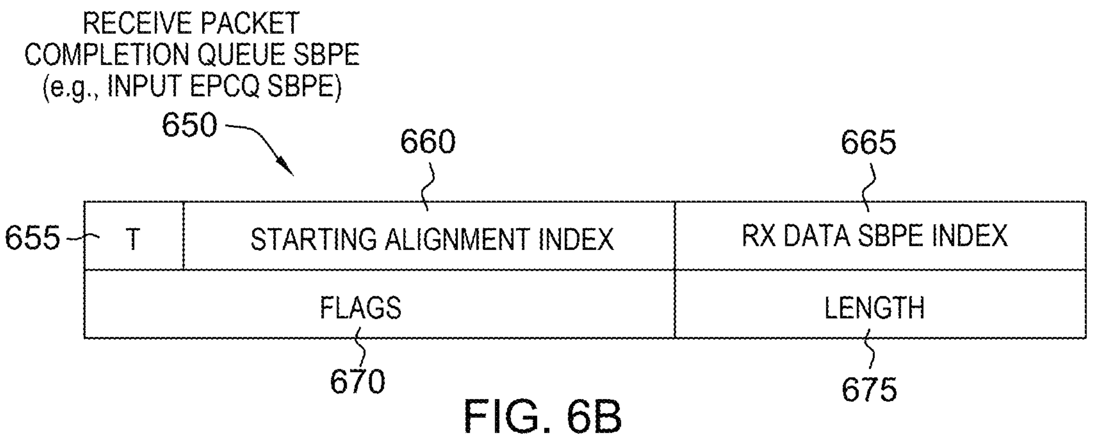
FIG. 6B depicts one example of a receive (RX) packet completion queue storage block page entry (SBPE), in accordance with one or more aspects of the present disclosure.

In one example, each packet completion queue (e.g., Ethernet packet completion queue) entry represents a specific packet (e.g., Ethernet packet) arrival. One example of a receive packet completion queue storage block page entry 650 is described with reference to FIG. 6B. In one example, receive packet completion queue storage block page entry 650 (also referred to as entry 650) includes, for instance:

Toggle (T) bit 655: In one example, bit 0 of byte 0 of word 0 of entry 650 includes a one-bit toggle control which is toggled by the adapter module each time the queue (e.g., packet completion queue (e.g., EPCQ)) wraps. This bit may be used by the control program to detect new work without having to access an adapter receive queue index (e.g., receive data plane adapter queue index 1100 described herein). It is to be initialized to, e.g., zero prior to queue activation, in one example.

Starting Alignment Index 660: In one example, byte 1 of word 0 of entry 650 includes a starting alignment index that identifies a packet's (e.g., Ethernet packet's) starting location within the control program buffer address corresponding to the input data storage block page entry index in specified alignment units.

In one example, it specifies a packet's (e.g., Ethernet packet's) starting location within a receive buffer (e.g., receive data buffer 600) in specified alignment units (e.g., 256 bytes). In one embodiment, the alignment index alignment unit is based on the control program cache line size. This can be a programmable value controlled by the queue information block (e.g., queue information block 510).

Receive (RX) Data Storage Block Page Entry (SBPE) Index 665: In one example, bytes 2-3 of word 0 of entry 650 contain the index associated with the data storage block page entry (the data SBPE contains a 4K buffer address into which the packet, e.g., Ethernet packet was stored). The alignment index is used to determine the starting location of the packet within the data SBPE 4K buffer.

Flags 670: In one example, flags 670 is a 2-byte field (e.g., bytes 0-1 of word 1) that may include error and packet, e.g., Ethernet packet, type flags. Flags 670 may be used to indicate, for instance, error conditions and packet parsing hints, such as: 0x8000—Malformed Packet; 0x4000—Checksum Error; 0x0008—Encapsulated Frame; 0x0004—IPV4 Packet; 0x0002—IPV6 Packet; and 0x0001—VLAN Packet. Other examples are possible.

Length 675: In one example, length 675 is, e.g., a 2-byte field (e.g., bytes 2-3 of word 1) that is used, in one example, to specify the actual packet, e.g., Ethernet packet, length from a network interface card (NIC) receive descriptor. This enables the control program to know the actual size of the packet, e.g., Ethernet packet, provided by the network interface card.

In one embodiment, each packet completion queue entry (e.g., EPCQ entry) represents a specific packet, e.g., Ethernet packet, arrival.

Figure 7:
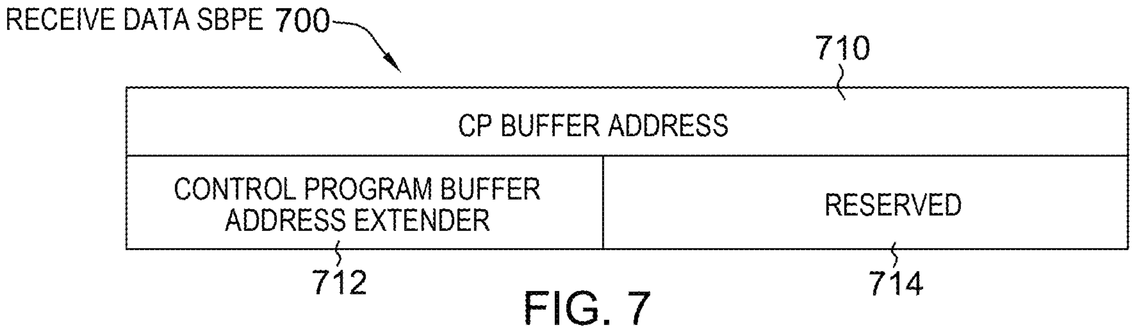
FIG. 7 depicts one example of a receive data storage block page entry (SBPE), in accordance with one or more aspects of the present disclosure.

One example of a receive data storage block page entry associated with a receive data storage block page entry index 665 is described with reference to FIG. 7. In one example, a receive data storage block page entry 700 (also referred to as entry 700) includes:

Control Program Buffer Address 710: In one example, word 0 of entry 700 includes a control program buffer address 710 that includes at least one portion of a control program buffer address. In one example, control program buffer address 710 is bits 0:31 of a storage block origin.

Control Program Buffer Address Extender 712: In one example, word 1 of entry 700 includes a control program buffer address extender 712 that includes another portion of a control program buffer address. In one example, control program buffer address extender 712 is bits 32:63 of a storage block origin. In one example, control program buffer address 710 and control program buffer address 712 provide a 64-bit control program buffer (e.g., receive buffer) address. In one example, the real address of the control program buffer is formed by appending, e.g., 12 zeros to the end of the storage block origin. This address is a starting location of a buffer into which the network interface card places the inbound packets (e.g., Ethernet packets). The location within the buffer is indicated by, e.g., starting alignment index 660. In one example, the storage block origin is to be on a 4K boundary. Other examples are possible.

In one example, bits 52 to 63 of word 1 are ignored by the network interface card and are reserved 714 for the control program. As one example, the low order bits (e.g., 12 of the lowest order bits) are reserved for, e.g., control program flags. Reserving the low order bits forces the address in the storage page block entry to be, e.g., 4K aligned. This is used to align the addresses with a memory page allocation algorithm which allocates memory in, e.g., 4K blocks. In other examples, other sizes and/or other alignments may be used.

Figure 8:
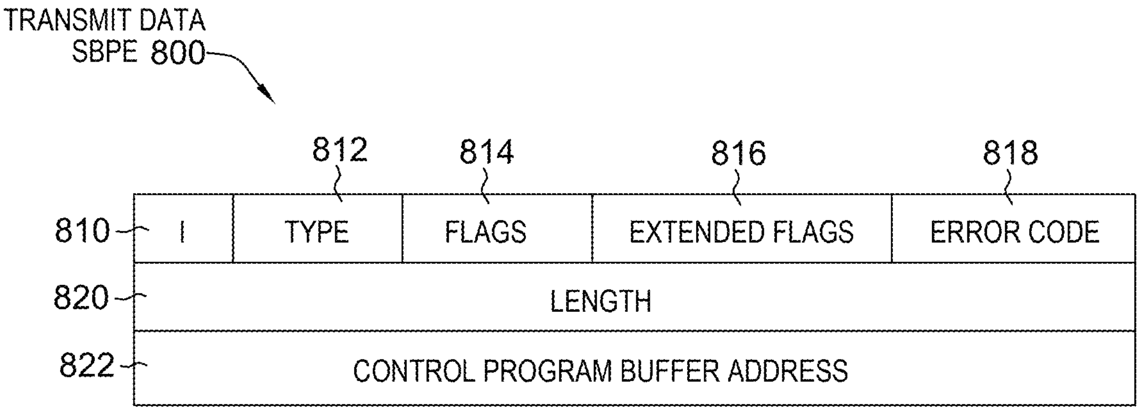
FIG. 8 depicts one example of a transmit data storage block page entry (SBPE), in accordance with one or more aspects of the present disclosure.

In addition to a receive data storage block page entry (e.g., receive data storage block page entry 700), there is a transmit data storage block page entry, an example of which is described with reference to FIG. 8. In one example, a transmit (TX) data storage block page entry 800 (also referred to as entry 800) includes:

I bit 810: In one example, bit 1 of word 0 of entry 800 is an immediate bit (I) that identifies whether the packet represented by entry 800 is immediate data where the storage block page entries store the transmit packet rather than storing a pointer to the transmit packet. This may be valid for the data plane, and not for the control plane, in one example.

Type 812: In one example, bits 2-7 of word 0 of entry 800 include a type that identifies the data type of the corresponding packet, such as 0x01 control packet or a 0x02 Ethernet packet, etc. Other data types are possible.

Flags 814: In one example, byte 1 of word 0 of entry 800 includes one or more flags. For instance, 0x80 is a chaining flag to "chain" together multiple storage block page entries where the data packet is stored in different memory locations or indicate the packet is stored in contiguous memory locations. Flags 814 may also include a flag (e.g., 0x40) to indicate that an interrupt is to be generated by the adapter module when processing the corresponding packet, and/or an error flag (e.g., 0x01), where an error code 818 contains the specific error code. Other examples are possible.

Extended Flags 816: In one example, byte 2 of word 0 of entry 800 includes one or more extended flags that may be reserved for use by the control program executing in, e.g., a logical partition. One example of an extended flag is 0x80-control program lock bit (optional)—that indicates that the storage block address is locked in memory. Other examples are possible.

Error Code 818: In one example, byte 3 of word 0 of entry 800 may include an error code, if generated.

Length 820: In one example, bytes 2-3 of word 1 of entry 800 include a total length of the control payload (e.g., control information and/or data pointed to by the buffer address in the output storage block page entries).

Control Program Buffer Address 822: In one example, bytes 0-3 of words 2-3 include a control program buffer address that supports any byte aligned address. In one example, control program buffer address 822 is a 64-bit storage block address. In one example, control buffer address 822 may be restricted where address 822 plus length 820 is not to cross, e.g., a 4K boundary, and instead should use chaining in that instance. Other examples are possible.

In one or more examples, the initial EQDIO implementation supports, e.g., a maximum of, e.g., 16 storage block table entries; a page size of, e.g., 4K for the storage block page and other relevant structures; and storage block page entries of either, e.g., 8 or 16 bytes in length. Other examples are possible.

As described herein, in one example, an entry 546 (FIG. 5A) of a system queue control array is a 256-byte entry on a 256-byte boundary that includes control program queue index controls (also referred to as control program queue index). The type of control program queue index controls depends on the queue type. For instance, there may be a control plane queue type, an input data plane queue type and an output data plane queue type, each of which has a control program queue index.

One example of a control program queue index used by the adapter module to determine which, if any, of the transmit storage block page entries in control program memory correspond to new transmit packets is described with reference to FIG. 9. In one example, a transmit data plane control program queue index 900 includes, for instance:

Initiative State 910: In one example, initiative state 910 is used to inform the control program of whether the adapter module is busy processing the transmit storage block page entries. For instance, when an adapter module is currently processing the transmit storage block page entries, it can update initiative state 910 so the control program knows that the adapter module is currently processing the transmit storage block page entries. Thus, if the control program has more packets ready to transmit (e.g., creates additional transmit storage block page entries), the control program queries initiative state 910, determines the adapter module is currently processing other transmit packets, and knows it does not need to alert the adapter module. When the adapter module is done processing the transmit packets (i.e., when the adapter module has completed all outstanding work), the adapter module can update initiative state 910 to indicate it is done. Later, if the control program has more transmit packets to process, it queries initiative state 910. If initiative state 910 indicates the adapter module is idle, the control program updates initiative state 910 as it posts the new work and interrupts the adapter module, so the adapter module knows that more transmit packets are ready to be sent.

Transmit (TX) Storage Block Page Entry (SBPE) Index 920: In one example, transmit storage block page entry index 920 may be updated to initiate data transfer from the control program to the adapter module. It indicates, for instance, the next storage block page entry to be used.

Completed SBPE Index 930: In one example, completed storage block page entry index 930 is used by the control program and is updated to indicate the prior transmit data storage block page entries that have been freed by the control program and can be used for new work. This enables two separate threads (processes) to handle new work and completed work. In one example, it prevents the work creator from wrapping the TX SPBE ring.

An example flow of the separate threads includes:

Control program updates control program transmit SBPE index 920 for new work.

Adapter module sees transmit SBPE index updated and gives transmit work to network interface card.

Adapter module gets completion events for, e.g., all packets and updates adapter transmit SBPE index (described herein; e.g., FIG. 11B).

Control program sees adapter transmit SBPE index update and frees associated resources associated with the completed transmit requests.

Control program updates the control program transmit completed SBPE index 930.

In one example, prior to a control program update of the transmit SBPE index, the control program compares the new transmit SBPE index with the current completed SBPE index to verify the transmit queue has not wrapped; e.g., when a network transmit stall occurs and outstanding transmit requests are not being processed.

In one example, if the control program filled in transmit storage block page entries 0-3, the control program updates completed storage block page entry index 930 to indicate "four" indicating that the control program filled in storage block page entries 0-3 and storage block page entry 4 is the next storage block page entry the control program will use. Once the control program storage block page entry index is updated, it transfers ownership of the transmit storage block page entries to the adapter module. At this point, the transmit storage block page entries become read-only to the control program, in one example.

In one embodiment, there is also a receive data plane control program queue index, an example of which is described with reference to FIG. 10. In one example, a receive data plane control program queue index 1000 (also referred to as index 1000) is, e.g., an 8-byte area defined in control program memory and is used by the control program to communicate with the adapter module (e.g., EQDIO adapter code). In one example, receive data plane control program queue index 1000 includes:

Initiative State 1010: In one example, initiative state 1010 is, e.g., 1 byte and indicates when the adapter module is to be provided initiative. Examples of providing initiative are described below:

0x81—Initiative-To-Be-Provided for new data storage block page entry allocations: set to this value at queue initialization; set to this value by the adapter module when the data queue is exhausted-no more control program buffers available.

0x82—Initiative-To-Be-Provided for newly completed packet completion queue (e.g., EPCQ) entries: this state is set by the adapter module when the packet completion queue is full, and the adapter module can no longer pass packet completion queue entries.

When in either initiative state, in one example, the adapter module pauses the receiving of packets for this specific receive queue. Other receive queues on the same interface can continue receiving packets if their initiative states are not in the "Initiative-To-Be-Provided" State.

In one example, the initiative state (e.g., initiative state 1010) for the receive data plane control program queue index (e.g., index 1000) is used by the adapter module to inform the control program (e.g., host operating system) there are no longer sufficient resources to enable receive traffic on the specific EQDIO receive queue. Based on this being set by the adapter module, the EQDIO receive queue is unenabled by the adapter module, and is not re-enabled until the, e.g., control program provides the resource to be used. This prevents, e.g., the adapter module from polling the receive data plane queue index to check for new allocations, and relies on the interrupt (initiative) from the control program to re-enable the EQDIO receive queue. Other examples are possible.

Initiative given state indicates the control program has given the adapter module initiative. In this state, the adapter module may update the initiative state to one of the Initiative-To-Be-Provided states.

0x40 is the normal running state when free buffers are available and packet completion queue entries are available.

This field, in one example, may be modified by both the control program and the adapter module.

The control program modification of this field is controlled by a selected architected instruction, such as a Set Control Program Queue Controls (SCPQC) instruction; however, this is only one example. Other instructions and/or other mechanisms may be used to modify this field.

In one example, execution of the Set Control Program Queue Controls instruction includes setting one or more control program (CP) queue index controls (e.g., receive data plane control program queue index 1000 and/or transmit data plane control program queue index 900) for one EQDIO input queue or output queue, specified by a general register field of the instruction (e.g., R3 of the instruction), to the value specified by, e.g., selected bits of bits 8 to 63 of the second operand of the instruction (e.g., R2 of the instruction). The result is indicated in a condition code of the instruction, as an example.

As indicated, in one example, selected bits of bits 8-63 of general register R2 are used to specify the control program queue index controls values to be set in the form of a control program queue index controls area (e.g., receive data plane control program queue index 1000 and/or transmit data plane control program queue index 900). In one example, bits 0-7 of general register R2 are not used to set the Initiative State (IS) in the control program queue index and are ignored. The instruction execution based on the index values determines the Initiative State (IS) value, in one example.

In one example, when the Set Control Program Queue Controls (SCPQC) instruction or other instruction is executed by the control program to update the receive data buffer storage block page entry index (e.g., index 1020 described below), if the state is Initiative-To-Be-Provided, the control program milli-code updates, in one example, an adapter initiative index control area (e.g., index 1590 described herein) via a selected I/O engine address which is defined during queue initialization.

Receive (RX) Data Buffer Storage Block Page Entry (SBPE) Index 1020: In one example, a receive data buffer storage block page entry index 1020 is, e.g., 16 bits and is updated to allocate receive buffers. In one example, this is a producer index used by the control program to indicate the next index in the queue to be updated with a free buffer. The control program uses this index to allocate buffer space to the adapter module for inbound packets (e.g., Ethernet packets).

Packet Completion Queue Entry Storage Block Page Entry (SBPE) Index 1030: In one example, a packet completion queue (e.g., EPCQ) entry storage block page entry index 1030 is, e.g., 18 bits and is updated by the control program to acknowledge receive packets. This is, for instance, a consumer index used by the control program to indicate processed packet completion queue entries. In one example:

- Adapter module detects new receive packets from the network interface card.
- Adapter module creates one new EPCQ entry for each packet.
- Adapter module updates the packet completion queue entry SBPE index in the adapter queue index area by one index for each packet.
- Control program detects adapter queue index update of the packet completion queue entry SBPE index.
- Control program processes the receive packet.
- Based on completing processing, the packet completion queue entry SBPE index in the control program queue index area is updated. This returns ownership of the EPCQ entries to the adapter module.
- The adapter module monitors the available packet completion queue entries by comparing the differences between the packet completion queue entry SBPE index in the control program queue index area to the packet completion queue entry SBPE index in the adapter queue index. If this value falls below a threshold, the adapter module limits the number of data buffers allocated to the network interface card.

In one embodiment, the initiative state in both the control program transmit and receive queue index areas works in the same manner. The initiative states inform the control program whenever the indices are updated and if the adapter module is to have initiative (e.g., if the adapter module is to be interrupted). For the control program receive queue index (e.g., index 1000), the adapter module can periodically check for new data storage block page entries and packet completion queue entries (EPCQs). In one example, the adapter module sets the initiative state to indicate initiative is to be provided when one of these resources becomes unavailable. This prevents the adapter module from having to poll these areas.

In one example, in addition to a receive data plane control program queue index, there is a receive data plane adapter queue index (e.g., adapter queue index controls in hardware system area 548), an example of which is described with reference to FIG. 11A. In one example, a receive data plane adapter queue index 1100 (also referred to as index 1100) includes an 8-byte area used by the adapter module to communicate with the control program.

In one example, receive data plane adapter queue index 1100 includes:

Data Storage Block Page Entry Index 1110: In one example, data storage block page entry index 1110 is, e.g., 16 bits, and is, for instance, a consumer index used by the adapter module to indicate when a buffer associated with a queue index is full and ownership is returned to the control program.

In one example, when the adapter storage block page entry index (e.g., index 1110) equals the control program storage block page entry index (e.g., index 1020), the circular FIFO is considered to be empty with no available free buffers. If this occurs during runtime, this is a condition in which the initiative state is to be set, e.g., to the 0x81 Initiative-To-Be-Provided state by the adapter module.

Packet Completion Queue (EPCQ) Entry Storage Block Page Entry (SBPE) Index 1120: In one example, packet completion queue entry storage page block entry index 1120 is, for instance, 18 bits, and is used as a producer index used by the adapter module to indicate the arrival of new packets (e.g., Ethernet packets). In one example, each packet, e.g., Ethernet packet, placed in a data storage page block entry buffer has an associated packet completion queue entry.

When, for instance, the adapter module completion queue SBPE Index (e.g., index 1120)+1=control program completion queue SBPE index (e.g., index 1030), the circular FIFO is considered full. If this occurs during runtime, this is a condition in which the initiative state is set to, e.g., the 0x82 Initiative-To-Be-Provided state by the adapter module.

Additionally, in one example, there is a transmit data plane adapter queue index (e.g., adapter queue index controls in hardware system area 548), an example of which is described with reference to FIG. 11B. In one example, a transmit data plane adapter queue index 1150 (also referred to as index 1150) includes an adapter SBPE index 1152 updated to indicate a transmit data transfer is complete.

Further details relating to the interrupt reduction control (IRC) (e.g., interrupt reduction control 520) are described with reference to FIG. 12. In one example, this control area is used to control interrupt generation between the control program and the adapter module. The queue ID, in one example, is used to map to an individual bit of the queue mask, described herein. Each receive and transmit queue (control and data planes) maps one to one to bits in the queue mask, in one example.

In one example, an interrupt reduction control 1200 is used to communicate the interrupt state (e.g., interrupt state 1210) between a control program and the adapter module. In one example, interrupt reduction control 1200 includes:

Interrupt State 1210 (e.g., one byte): In one example, byte 0 of word 0 includes the interrupt state that contains shared state information. The control program sets a state to indicate to the adapter module that it is to generate an interrupt. The adapter module may set a state when the interrupt is generated.

Examples of interrupt state 1210 include:

Single Interrupt—0x00

The entire 8-bytes of the interrupt reduction control are to be, e.g., zero for the adapter module to place the interface into "Single Interrupt" state. It is the control program's responsibility to verify the interrupt reduction control is, e.g., all zeros to set the interface to "Single Interrupt" with, e.g., a compare and swap instruction or by another mechanism.

In one example, the control program is responsible for setting the interrupt reduction control to, e.g., all zeros. The adapter module relies on this setting to initiate the interrupt to the control program. The adapter module can set the interrupt state to "no interrupt state" from the "single interrupt" state. The control program can change the interrupt state at any time, in one example.

Set by the control program when it wants an adapter interruption to signal the arrival of new incoming work.

Initialization State

Results in an adapter module interruption to be initiated on the next adapter queue index update by the adapter module or when processing a transmit storage block page entry with a program-controlled interruption request turned on by the control program.

The adapter changes the interface state to "No Interrupt" state, in one example.

No Interrupt—0x80

Set by the adapter module when an adapter interruption is generated.

No additional adapter module interruptions are to be initiated by the adapter module until the control program places the interface back into "Single Interrupt" state. The adapter module updates, e.g., the 32-bit queue mask for any additional incoming data or program-controlled interruptions.

No Interrupt—Processing State-0x81

Set by the control program whenever it starts processing inbound data-used by the adapter module when processing "Threshold A" limits set by a control program in the queue format record information block.

Queue Mask 1220 (e.g., 32 bits in word 1), which maps to the queue ID specified in the queue descriptor. There is one bit per queue ID, as an example.

Queue Mask-32 Bit Format Example

Queue ID 0—Input (RX) Control Queue assigned to Queue Mask 0 (0x80000000—Bit 0).

Queue ID 1—Output (TX) Control Queue assigned to Queue Mask 1 (0x40000000—Bit 1).

Queue ID 2 to the Maximum Supported Queue ID by the adapter module returned by a CHSC (Channel Subsystem Command)×'24' format 1 instruction for all selected transmit and receive data plane queues.

In one or more aspects, to support additional features which use selected processing by the adapter module for specific inbound packets (e.g., Ethernet packets), a series of adapter module managed receive queues are defined, in one example. These receive queues are defined to interact between the adapter module and the network interface card.

The following is a description of these selected receive queues and the features they are used for:

MAC (Media Access Control) Address Learning Queue—This queue is configured by the adapter module to have received packets (e.g., Ethernet packets) which do not match any EQDIO registered MAC address forwarded by the network interface card to this queue. This enables the MAC learning function to be performed by the adapter module and interact with a virtual switch configured in the MAC learning mode.

LLDP (Link Level Discovery Protocol) Queue—This queue is configured by the adapter module to have received packets (e.g., Ethernet packets) with a destination MAC of the network interface card burned-in-address forwarded by the network interface card to this queue. This enables the adapter module to isolate the Ethernet control traffic from normal network traffic.

ARP (Address Resolution Protocol) Offload Queue—This queue is configured by the adapter module to have received address resolution protocol traffic forwarded by the network interface card to this queue. This enables the adapter module to perform address resolution offload and address resolution offload filtering functions when configured by a control program.

VLAN (Virtual Local Area Network) Discovery Queue—This queue is configured by the adapter module to have received Ethernet traffic which contains a registered VLAN ID, but the corresponding MAC Address is not associated with the VLAN ID be forward to this queue. This enables the adapter module to perform a VLAN discovery feature. The adapter module verifies the MAC address has been registered by the same EQDIO interface which registered the matching VLAN. If so, the appropriate configuration of the MAC with the VLAN is performed by the adapter module. This function is used, e.g., for hypervisors who register large groups of MAC addresses and VLAN IDs separately.

Network Traffic Analyzer Queue—This queue is configured by the adapter module to have received Ethernet traffic matching a configured set of Ethernet packet contents to this queue. This enables the adapter module to provide a Network Traffic Analyzer function if configured.

Other examples are possible.

Although one example of a queue structure and its components are described herein, each component and/or the queue structure itself may have additional, fewer and/or other components/fields/information. The examples provided herein are just examples and not meant to be limiting in any way. Further, although specific locations, specific fields and/or specific sizes of the fields may be indicated (e.g., specific bytes and/or bits), other locations, fields and/or sizes may be provided. Further, although the setting of a bit to a particular value, e.g., one, zero, other value, may be specified, this is only an example. The bit, if set, may be set to a different value, such as the opposite value or to another value, in other examples. Many variations are possible.

In one or more aspects, the enhanced queued direct input/output queues are used in communication between at least one control program and a network interface card. To facilitate communications, an adapter module is used. In one example, the adapter module uses the information in a queue descriptor record (e.g., queue descriptor record 502), transmitted from the control program to the adapter module, to establish the receive and transmit queues that permit the control programs and the network interface card to communicate with one another using the adapter module and the queues.

In one example, enhanced queued direct I/O processing used to transmit packets between, e.g., a control program and a network interface card uses, for instance, enhanced queued direct I/O processing code (e.g., enhanced queued direct I/O processing code 150). The code is, e.g., computer-readable program code (e.g., instructions) in computer-readable storage media, e.g., storage (persistent storage 113, cache 121, storage 124, other storage, as examples). The computer-readable storage media may be part of one or more computer program products and the computer-readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 250) and/or other processor(s) or node(s);

processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the code and/or portions thereof. Many examples are possible.

Figure 13:
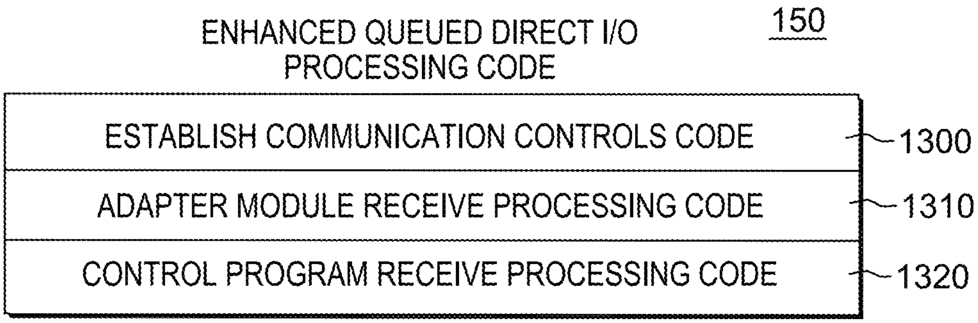
FIG. 13 depicts one example of enhanced queued direct input/output (I/O) processing code of FIG. 1, in accordance with one or more aspects of the present disclosure.

In one example, referring to FIG. 13, enhanced queued direct input/output processing code 150 includes establish communication controls code 1300 to be used to establish communication controls to be used in communication between one or more control programs and a network interface card via, e.g., an adapter module; adapter module receive processing code 1310 to be used in receive processing between a control program and a network interface card; and control program receive processing code 1320 to be used in control program receive processing.

Although the enhanced queued direct I/O processing code 150 is depicted in persistent storage 113, one or more code portions may be in other locations, other than persistent storage 113. Further, in one or more examples, different cores of one processor or multiple processors may execute the code portions. Many examples are possible.

Figure 14:
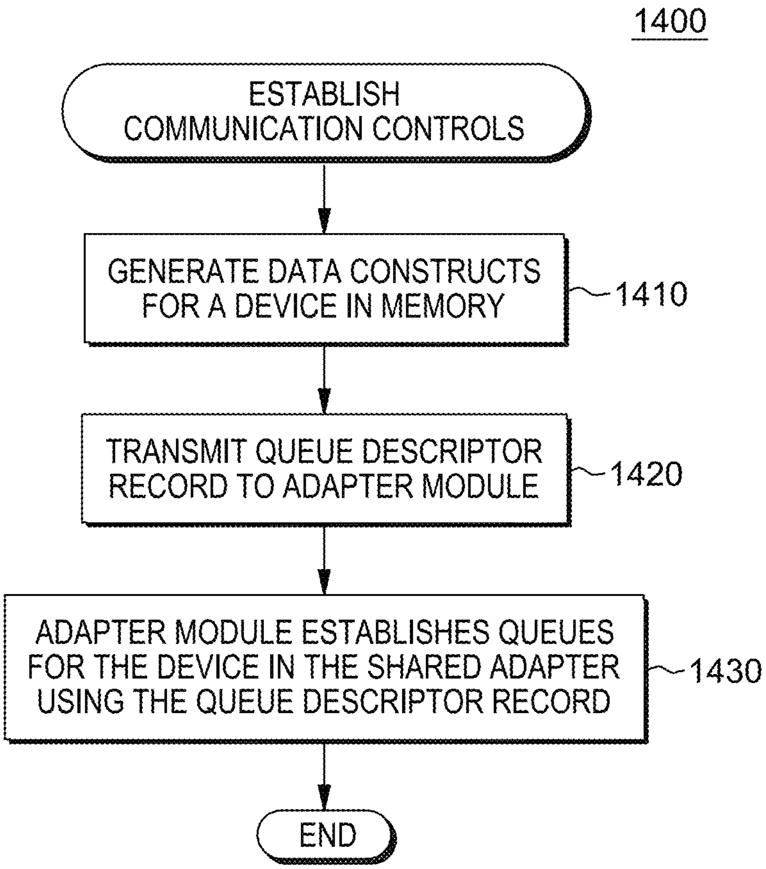
FIG. 14 depicts one example of establish communication controls processing of the enhanced queued direct I/O processing code of FIG. 13, in accordance with one or more aspects of the present disclosure.

In one example, establish communication controls code 1300 of enhanced queued direct I/O processing code 150 is used in establish communication controls processing. One example of such processing is described with reference to FIG. 14. In one example, an establish communication controls process 1400 (also referred to as process 1400) is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 250) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

Figure 15:
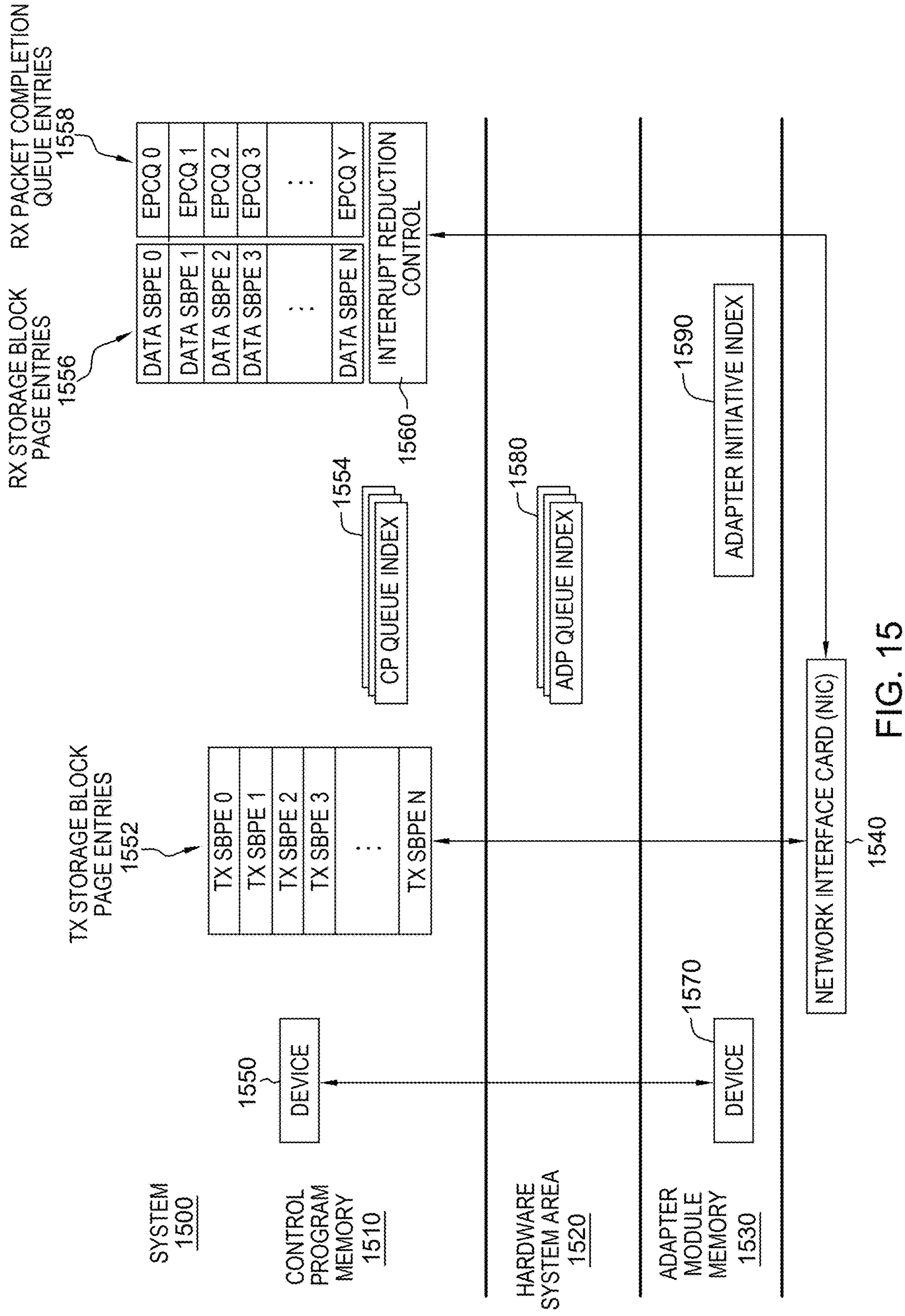
FIG. 15 depicts one example of transmit (TX) and receive (RX) data constructs of a queue structure used in accordance with one or more aspects of the present disclosure.

In one example, process 1400 generates 1410 one or more data constructs (e.g., components) of a queue structure for a device in memory (e.g., control program memory). For example, as depicted in FIG. 15, in a shared resource system 1500, a control program executing within system 1500 (e.g., on a computing device) generates the following data constructs for a device (e.g., device 1550) and stores them in memory (e.g., control program memory 1510): transmit storage block page entries 1552, one or more control program queue indices 1554, one or more receive storage block page entries 1556, one or more receive packet completion queue entries 1558 and/or an interrupt reduction control 1560, as examples. Additional, fewer and/or other data constructs of one or more queues may be generated.

In one example, during EQDIO initialization, the control program configures the following, as examples: the number of receive data buffer storage block page entries to be grouped in a single virtual buffer-currently set to, e.g., 32; the cache line byte boundary-currently set to, e.g., 256; the number of receive data buffer storage block page entry entries; and/or the number of receive packet completion queue (e.g., EPCQ) entries; and/or inbound packing parameters, such as, for instance, latency timer to trigger when an idle interface starts receiving traffic; streaming timer which goes into effect once a connection is detected to be in a streaming mode; and/or a packet count which indicates maximum packets which can be received without a control program notification. Additional, fewer and/or other inbound packing parameters and/or configuration parameters may be defined.

Returning to FIG. 14, based on generating the one or more data constructs for the device (e.g., device 1550) in memory (e.g., control program memory 1510), process 1400 transmits 1420 a queue descriptor record associated with the one or more generated data constructs to the adapter module executing on a computing device of system 1500. For instance, the control program transmits the queue descriptor record (e.g., queue descriptor record 502) to the adapter module via devices 1550 and 1570. The computing device executing the adapter module may be the same or different from the computing device executing the control program. In one example, the queue descriptor record is transmitted via, e.g., an Establish-QDIO-Queues Channel Command Word (CCW) of a Start Subchannel instruction. Other mechanisms for providing the queue descriptor record to the adapter module may be used.

Using the queue descriptor record, the adapter module (via, e.g., process 1400 or another process) establishes 1430 one or more queues (e.g., data constructs) for a device (e.g., device 1570) in e.g., adapter module memory 1530 coupled to the control program. In one example, the adapter module establishes transmit and receive control queues for establishing the control plane and then establishes transmit and receive data queues for the data plane subsequent to the control plane being established. Other examples are possible.

In one example, 32 receive data storage block page entries are grouped together to define, e.g., a single 128K block. In establishing the receive data queues, as an example, the adapter module (e.g., EQDIO adapter code) builds, e.g., a single 128K virtual address and maps the 32 receive data storage block page entries to back the virtual address, giving the physical network interface card a single contiguous 128K block. In one example, 32 is a configurable parameter, which is set, e.g., in the EQDIO initialization process. It is included, e.g., in a control block exchanged prior to execution of the establish queues, in one example.

In one example, once the one or more queues are established (e.g., the control program generates the queue(s) (e.g., data constructs for the queue(s)), provides the queue descriptor record for the queue(s) to the adapter module and the adapter module establishes the queue(s)), the queue(s) are activated (e.g., via an Activate Channel Command Word) by the control program. Based thereon, communication between the control program and the adapter module is via, e.g., the EQDIO processing and the established queue(s). Channel command word processing is not used, in one example, for further communication between the control program and the adapter module.

After initializing the EQDIO parameters described herein, the control program allocates a set of receive data storage block page entries in the defined group and notifies the adapter module, using the initiative state, that the first set of receive data storage block page entries are available. At this point the control program notifies the adapter module that inbound packets can be accepted.

In one example, the adapter module consumes the receive data buffers in groups of, e.g., 32. If, after establishing the communication controls, the adapter module is to allocate additional space to the physical adapter (e.g., network interface card) and 32 receive data storage block page entries are not available, the adapter module sets the initiative state in the control program receive queue index area (e.g., initiative state 1010 (FIG. 10)) to indicate insufficient buffers are available. This causes the control program to give initiative (interrupt) to the adapter module when a minimum of, e.g., 32 (or whatever the configured minimum number is) receive data storage block page entries are available.

As indicated, in one or more aspects, the queue descriptor (QD) and queue descriptor record (QDR) are referenced during an establish queues process. After the establish queues process is complete, the queue descriptor and queue descriptor record may be deallocated in memory. The firmware copies this information, in one example, during the establish queues process.

Further details of selected components of FIG. 15 are described herein. As depicted in FIG. 15, system 1500 includes, for instance, control program memory 1510 (e.g., memory owned by the control programs and/or logical partitions), a hardware system area (HSA) 1520 (e.g., selected memory that includes configuration information), and adapter module memory 1530 (e.g., memory owned by the adapter module). Adapter module memory 1530 includes, e.g., an adapter module (e.g., EQDIO adapter code) that serves as an interface between, e.g., a network interface card (NIC) 1540 and the logical partitions (e.g., the control programs).

In one example, the data constructs in control program memory 1510 include device 1550, transmit (TX) storage block page entries (SBPE) 1552, one or more control program (CP) queue indices 1554, receive (RX) storage block page entries 1556, receive (RX) packet completion queue entries 1558, and an interrupt reduction control 1560. Additional, fewer and/or other components/constructs may be a part of control program memory 1510.

In one example, device 1550 establishes a connection between the control program and device 1570 in adapter module memory 1530 and is used for communications between the control program and the adapter module prior to establishing a queue (e.g., the data constructs/components of the queue). Each logical partition (or each control program in the logical partition) that wishes to use network interface card 1540 may create its own device 1570. Device 1550 can include (or have associated therewith) any number of data queues that rely on the data constructs described herein to facilitate communication between the control program and the adapter module and/or network interface card. For example, there can be a configurable number of data queues which can be any mix of transmit (TX) or receive (RX) queues. In one embodiment, there is at least one data plane transmit queue and one data plane receive queue. In addition, a device (e.g., device 1550, device 1570) includes at least one pair of control queues (i.e., one control plane transmit queue and one control plane receive queue). Other examples are possible.

In one example, transmit storage block page entries 1552 contain pointers to packets that are being transmitted from the control program to the network via network interface card 1540. Transmit storage block page entries 1552 may also include pointers to control information which is used to pass configuration or debug types of information between the control program and the adapter module. Each storage block page entry indicates that the packet is stored in one location, or that the packet is stored in multiple different locations (e.g., the headers may be stored in one location, while the payload is stored in another location). Thus, the pointers in the storage block page entries 1552 may support either type of strategy for storing the transmit packets in memory. Note that in one embodiment, the storage block page entries themselves can store the transmit packets, rather than having pointers to those packets. Other examples are possible.

Control program queue index 1554 is used to indicate, e.g., the number of transmit storage block page entries 1552 that are ready to be processed by the adapter module. For example, assume that the control program has packets (e.g., four packets) to be sent onto the network (e.g., network 314, FIG. 3) via network interface card 1540, the control program generates, e.g., four transmit storage block page entries 1552 (e.g., transmit storage block page entries 0-3) for those four packets and then updates control program queue index 1554 (e.g., completed SBPE index 930) to inform the adapter module that the control program has four packets ready to be transmitted. The adapter module reads control program queue index 1554, fetches the four transmit storage block page entries 1552, and provides the addresses and lengths in the transmit data SBPEs directly to the network interface card 1540. The network interface card then transmits the packets to the network based on the transmit storage block page entries information.

In one embodiment, each transmit queue and receive queue includes its own control program queue index 1554 and an adapter (ADP) queue index 1580 (e.g., transmit data plane adapter queue index 1150, receive data plane adapter queue index 1100).

Receive packet completion queue entries 1558 map locations of packets, e.g., Ethernet packets, in a receive data buffer. In one embodiment, the adapter module uses packet completion queue entries 1558 to indicate new receive packet arrivals which have been placed in control program buffer memory by the network interface card.

Interrupt reduction control 1560 is set by the adapter module when, e.g., an interrupt is generated. In one embodiment, interrupt reduction control 1560 includes an interrupt state (e.g., one byte; e.g., interrupt state 1210) which the control program sets to indicate when an interrupt is to be provided. For example, if the control program has finished processing the received packets, in one example, the control program sets the interrupt state to indicate it is idle. Thus, if the adapter module receives additional packets, it can use the interrupt state to determine whether it should then send an interrupt to the control program. For example, if the interrupt state indicates that the control program is not currently processing data in the receive queues, then, in one example, the adapter module sends an interrupt to the control program. However, if the interrupt state indicates the control program is currently processing receive packets, an interrupt is not needed.

Moreover, in one embodiment, interrupt reduction control 1560 includes, in one example, a bit mask (e.g., mask 1220) where each bit corresponds to a queue ID of a queue corresponding to (e.g., in or associated with) the device (e.g., device 1550). The adapter module uses the bit mask to indicate which queues have data ready to be processed by the control program. While there may be multiple queues for data device 1550, there is one interrupt reduction control 1560 for each device 1550, in one example.

Hardware system area 1520 is a selected memory area used for hardware configuration tables. In this example, hardware system area 1520 includes one or more adapter queue indices 1580. In one embodiment, an adapter queue index 1580 is read/written by the adapter module and read by the control program. The adapter module updates adapter queue index 1580. There are different types of adapter queue indices that may be stored in the hardware system area and used in EQDIO processing, including, but not limited to, a transmit adapter queue index (e.g., transmit data plane adapter queue index 1150) and a receive adapter queue index (e.g., receive data plane adapter queue index 1100). A transmit adapter queue index is used by the adapter module to indicate the completion of a control plane request or the completion of a packet transmission. During transmission, the adapter module receives transmit completions and updates the transmit adapter queue index. As such, a transmit adapter queue index stores, in one example, the next transmit storage block page entry index to be consumed by the adapter module. Moreover, updates by the adapter module to adapter queue index 1580 are used, in one example, to indicate the completion of transmit control or data requests. Control program queue index 1554 indicates the next entry which will contain a new transmit control or data request.

For a receive adapter queue index (e.g., receive data plane adapter queue index 1100), the adapter module updates this index to describe received packets. The index indicates, for instance, the next receive data storage block page entry 1556 to be consumed by the adapter module (e.g., index 1110) and the next receive packet completion queue entry 1558 to be produced by the adapter module (e.g., index 1120). The data storage block page entry index (e.g., index 1110) is updated when the adapter module has used the allocated space in a data storage block page entry and ownership of the buffer space is returned to the control program.

In addition to device 1570, adapter module memory 1530 also includes, in one example, an adapter initiative index 1590. This data construct is used by the control program, in one example, to interrupt or wake up the adapter module when the control program has packets ready to be transmitted. The adapter module uses control program queue index 1554 (e.g., transmit data plane control program queue index 900) to retrieve transmit storage block page entries 1552 and program the network interface card to fetch the corresponding transmit packets from control program memory 1510 using the pointers in transmit storage block page entries 1552. In one example, when adapter initiative index 1590 is used, the control program copies the contents of control program queue index 1554 into the adapter initiative index 1590. The adapter module can then directly fetch the transmit storage block page entries corresponding to the queue index without fetching control program queue index 1554.

In one or more aspects, the EQDIO queues and protocols are used to receive data by a control program (e.g., a host operating system) from a network interface card using an adapter module. The EQDIO protocol is used to efficiently execute in a highly virtualized environment. This highly virtualized environment enables the configuration of a large number of control programs (e.g., host control programs; for example, 2K) to share a single network interface card. Each control program can define up to, e.g., 32 unique queues on its specific interface. Each EQDIO queue is configured with its own specific packet criteria and each is defined by its queue structure.

Each EQDIO interface can have multiple configured EQDIO receive (RX) queues, each having a unique set of routing rules used to demultiplex received packets (e.g., Ethernet packets) into a specific queue. The number of EQDIO receive queues is configured at EQDIO initialization time by the specific control program, as an example.

In one or more aspects, each receive (RX) queue is defined by a unique queue descriptor (e.g., queue descriptor 540). In one example, a receive data plane queue descriptor maps both the data and packet completion queue (e.g., EPCQ) circular FIFOs. In one example, each receive queue is assigned a unique queue identifier (e.g., queue ID 542) in the queue descriptor. The receive queue defined with the lowest queue ID (e.g., during establish queues) is defined as the primary input queue, in one example. The primary input queue acts as a default input queue when an input packet cannot be steered to another (ancillary) input queue. The queue ID defined in the queue descriptor is used to map to the queue mask in an interrupt reduction control (e.g., interrupt reduction control 1560). The queue descriptor identifies if the receive queue is a control or data plane queue, as an example.

Figure 16:
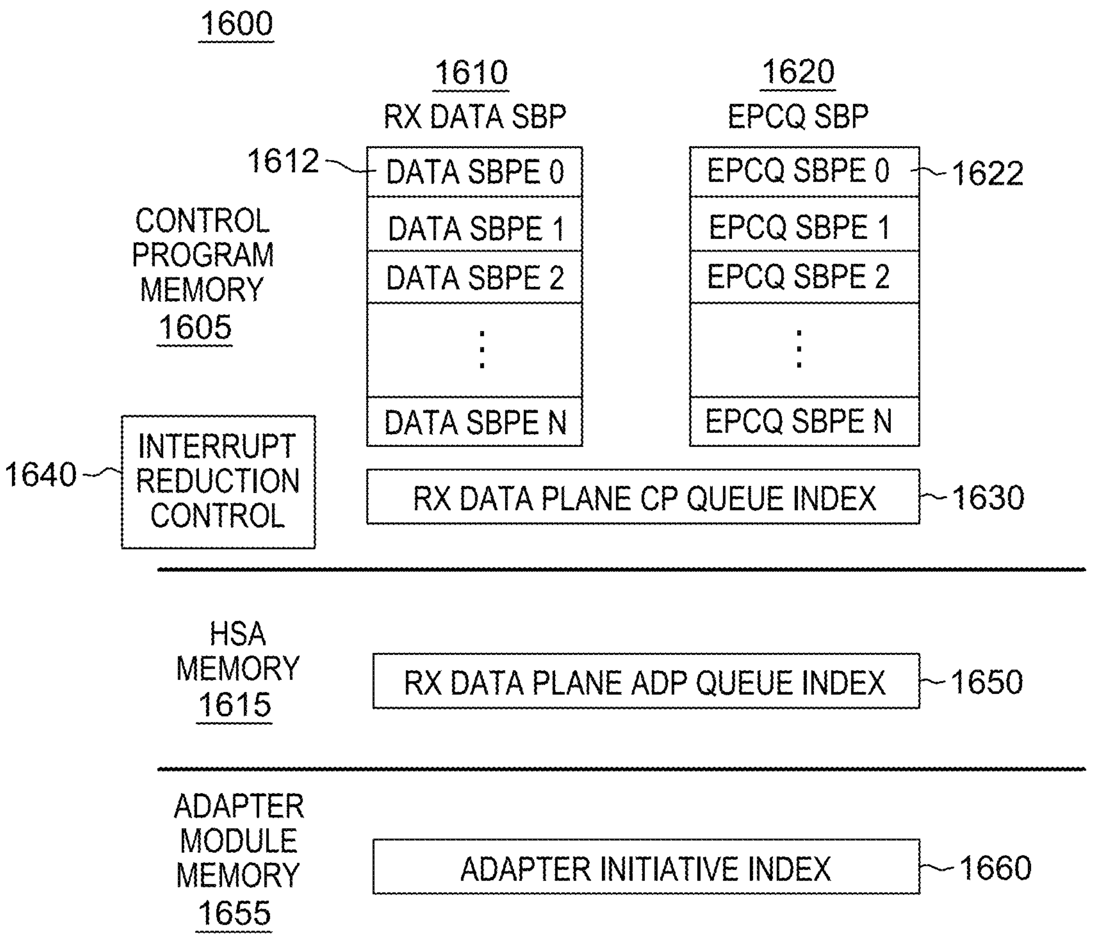
FIG. 16 depicts further details of one example of receive (RX) data constructs of a queue structure used in accordance with one or more aspects of the present disclosure.

One example of various constructs/components of a queue structure of an EQDIO receive (RX) data plane queue are further described with reference to FIG. 16. In one example, a receive data queue structure 1600 has a configurable set of storage block page entries (SBPEs) for data and packet completion queue (EPCQ) information. For example, queue structure 1600 includes one or more receive data storage block pages 1610 to be used to indicate where receive packets are stored in a buffer and one or more packet completion queue (e.g., Ethernet packet completion queue) storage block pages 1620 to be used to store packet completion queue (EPCQ) information. In one example, a receive data storage block page 1610 includes one or more receive (RX) data storage block page entries 1612 (e.g., up to a maximum of, e.g., 64K) and a packet completion queue storage block page 1620 includes one or more packet completion queue storage block page entries 1622 (each page is, e.g., 4K and contains up to 512 8-byte storage block page entries).

In one example, receive data plane queues support multiple inbound packets, e.g., Ethernet packets, to be placed (packed) in a single data storage block page. The total number of receive+transmit queues is not to exceed, e.g., 32, but there are to be at least two receive queues defined, one for the control and one for the data plane. Other examples are possible.

In one example, the receive data storage block page entries are read/write for the control program and read-only for the adapter module until ownership is transferred to the control program, then only read/write by the control program. A packet (e.g., Ethernet packet) completion queue (EPCQ) (e.g., packet completion queue storage block pages) maps the received packets (e.g., Ethernet packets) placed in the receive buffers. There is a packet completion queue (EPCQ) defined for each data plane receive queue (e.g., receive data storage block pages; also referred to as a data queue), in one example. The data queue and the packet completion queue are not required to have the same allocated number of storage block page entries.

An EPCQ storage block page entry represents, for instance, a single received packet (e.g., Ethernet packet) and includes, for instance, a packet length (e.g., Ethernet packet length; e.g., length 675) and zero or more error indicators (e.g., flags 670). The packet completion queue maps into an interrupt reduction control (IRC) (e.g., an interrupt reduction control 1640) at the same index as the associated data queue. In one example, the receive queues are mapped to a single interrupt reduction control (e.g., single interrupt reduction control 1640).

In one example, each receive queue has, for instance, a control program queue index (e.g., a receive data plane control program queue index 1630, an example of which is depicted in FIG. 10) in control program memory 1605, an adapter (ADP) queue index (e.g., a receive data plane adapter queue index 1650, an example of which is depicted in FIG. 11A) in HSA memory 1615 and an adapter (e.g., Open Systems Adapter (OSA)) initiative index (e.g., an adapter initiative index 1660) in adapter module memory 1655. As examples, the receive data plane control program queue index (e.g., index 1630), receive data plane adapter queue index (e.g., index 1650) and adapter initiative index (index 1660) control areas are logistically used for the following: Transfer ownership of receive buffers between the control program and the adapter module; control program notification to the adapter module of newly available free buffers; adapter module notification to the control program of received packets (e.g., Ethernet packets); control program indication of the number of processed packet completion queue entries; and/or adapter module notification to control program to indicate free buffers have been exhausted. The logistics occur by modifying the various fields in the control areas, which are described herein.

In one example, the following rules apply to the control program queue indices, the adapter queue index and to buffer management logistics between the control program and the adapter module. The receive data plane control program queue index (e.g., receive data plane control program queue index 1630) corresponds to the next data storage block page entry the control program is to use to provide a new free buffer; the receive data plane adapter queue index (e.g., receive data plane adapter queue index 1650) corresponds to the next data storage block page entry to be returned by the adapter module; a control program packet completion queue (e.g., EPCQ) entry storage block page entry index corresponds to the next EPCQ SBPE the control program is to process; an adapter EPCQ entry storage block page entry index corresponds to the next EPCQ SBPE the adapter module is to use to provide a received packet (e.g., Ethernet packet); the data circular FIFO is empty of free buffers when the adapter data storage block page entry index equals the control program data storage block page entry index; the packet complete queue (e.g., EPCQ) circular FIFO (e.g., 558) is full of pending inbound packets (e.g., Ethernet packets) to the control program when the adapter packet completion queue (e.g., EPCQ) storage block page entry index+1 equals the control program packet completion queue (e.g., EPCQ) storage block page entry index; and the packet completion queue (e.g., EPCQ) circular FIFO (e.g., 568) is empty (the control program has processed the pending entries) when the adapter packet completion queue (EPCQ) storage block page entry index equals the control program packet completion queue (EPCQ) storage block page entry index.

In accordance with one or more aspects, to provide efficiencies, the adapter module (e.g., EQDIO adapter code) groups together a set of receive data storage block page entries into a single large virtual buffer. The number of receive data storage block page entries is configured by, e.g., the control program during EQDIO initialization. The current implementation uses, e.g., 32 data storage block page entries, each of which is, e.g., 4K in size allocating, e.g., a 128K virtual address space.

In one example, to map the, e.g., 128K virtual address space using the, e.g., 32 data storage block page entries, the adapter module reserves, e.g., thirty-two page table entries (PTEs) for each, e.g., 128K virtual address space. The adapter module reserves, e.g., eight 128K virtual address spaces for each EQDIO receive data queue defined, such that 32*8, or 256 page table entries, are reserved. The 256 page table entries are defined as fixed for each receive data queue. Since these page table entries are fixed and just recycled continuously to the network interface card, the adapter module uses the receive data storage block page entries to replace the real addresses in each page table entry and then re-allocates the 128K virtual address space back to the network interface card.

In one example, these page table entries are not visible to the control program (e.g., host control program) and the control program has no way of mapping the virtual addresses provided by the adapter module to a physical buffer address in the control program memory.

As packets arrive, the adapter module (e.g., EQDIO adapter code) uses the packet completion queue storage block page entries (e.g., Ethernet packet completion queue storage block page entries 1622) to provide the physical buffer address for each packet, e.g., Ethernet packet.

The following describes one example of how the various EQDIO structures are used to pass ownership of buffer space between the control program and the adapter module (e.g., EQDIO adapter code). The control program maintains, e.g., two EQDIO receive buffer spaces in its memory to contain the individual storage block page entries. One EQDIO receive queue is defined to contain receive data storage block page entries, which contains, e.g., 64-bit addresses of a receive buffer space. The second EQDIO receive queue is defined to contain packet completion queue (Ethernet Packet Completion Queue) storage block page entries which are used to define the location of the packets (e.g., Ethernet packets) associated with the receive data storage block page entries. Other examples are possible.

The EQDIO receive queue index area (e.g., receive data plane control program queue index 1630) is used to pass ownership of the receive data buffer storage block page entries and the packet completion queue storage block page entries between the control program and the adapter module.

The initial storage block page entry index for both the receive data buffer storage block page entry index and the packet completion queue (e.g., EPCQ) storage block page entry index are set at, e.g., 0. As receive data buffers are allocated, the control program increments the receive data buffer storage block page entry index (e.g., receive data buffer storage block page entry index 1020).

In one example, as inbound packets are received by the network interface card and placed into the receive data buffers, the adapter module builds a packet completion queue entry to represent each received packet, e.g., Ethernet packet.

Figure 17:
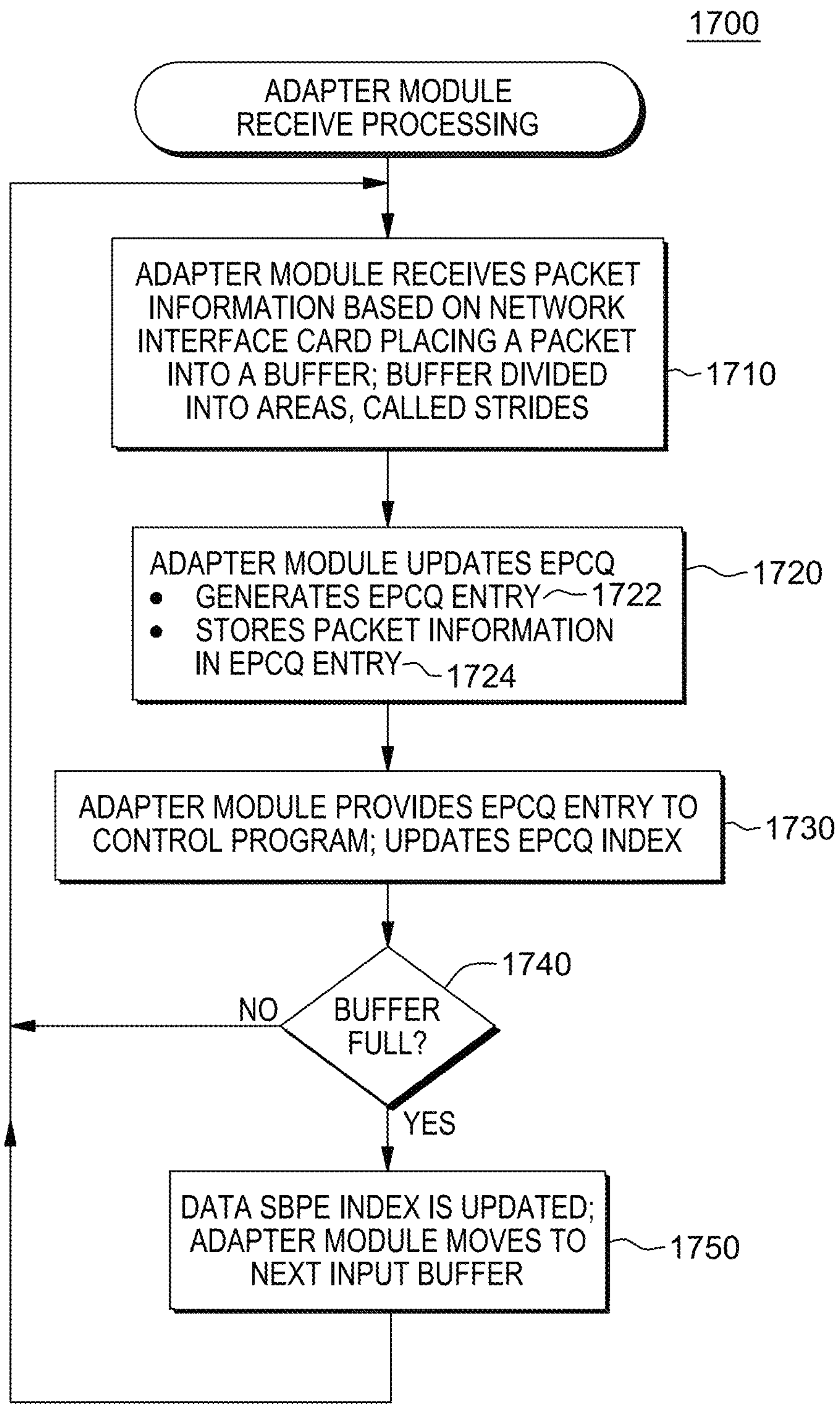
FIG. 17 depicts one example of adapter module receive processing of the enhanced queued direct I/O processing code of FIG. 13, in accordance with one or more aspects of the present disclosure.

One example of adapter module receive processing is described with reference to FIG. 17. In one example, an adapter receive process 1700 (also referred to as process 1700) is executed as part of an adapter module (e.g., EQDIO adapter code, which includes and/or uses, in one example, adapter module receive processing code 1310) executing on one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 250) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

In one example, process 1700 includes the adapter module receiving 1710 packet information based on the network interface card placing a packet into a buffer (e.g., a receive buffer). In one example, the adapter module divides the buffer into strides and the packet is placed in a selected stride. Based thereon, the adapter module, updates 1720 a packet completion queue, such as an Ethernet packet completion queue (e.g., EPCQ) storage block page 1620. For instance, the adapter module generates 1722 an entry (e.g., EPCQ storage block page entry 1622) within the packet completion queue storage block page and stores 1724 packet information within the entry. For instance, it stores one or more of a starting alignment index (e.g., starting alignment index 660), receive data storage block page entry index (e.g., RX data storage block page entry index 665), and length (e.g., length 675). Additional, fewer and/or other data may be stored.

The adapter module then provides 1730 the packet completion queue entry to the control program. As examples, it provides an indication to the control program of the updated packet completion queue entry (e.g., updates the packet completion queue index (e.g., packet completion queue entry SBPE index 1120); it allows access to the updated packet completion queue entry; and/or it updates control program memory, etc. Other examples of providing the packet completion queue entry are possible.

In one example, the adapter module builds the packet completion queue (EPCQ) entries in its local memory, and then based on the set of inbound packing parameters or a full cache line (e.g., 32 8-byte EPCQ entries fills a cache line), the adapter module copies the local packet completion queue (EPCQ) entries into the control program packet completion queue (e.g., EPCQ storage block page entry (SBPE) 1622), thus providing the packet completion queue entry to the control program.

For example, as a packet (e.g., Ethernet packet) arrives, an individual EPCQ entry is created by the adapter module to represent each received packet (e.g., Ethernet packet). For each packet (e.g., Ethernet packet), in one example, the adapter module places the following data in each EPCQ entry (e.g., receive packet completion queue entry 650), as an example:

- Starting Alignment Index (e.g., starting alignment index 660)—This defines the starting location of the packet (e.g., Ethernet packet). To compute this location, the index value is multiplied by the cache size, in one example.
- Receive Data Buffer SPBE Index (e.g., receive data buffer storage block page entry index 665)—This is an index associated with the control program queue receive data buffer into which the packet (e.g., Ethernet packet) was placed. The index is used to give the control program the starting receive data buffer address which maps to a physical address, providing the translation from virtual addresses to real addresses.
- Flags (e.g., flags 670)—Selected "parsing" flags which assist the control program code with the parsing and possible demultiplexing of the packet. These flags include, e.g., VLAN flags, IP type, TCP or UDP. Additional, fewer and/or other flags may be used.
- Length (e.g., length 675)—Actual packet length as reported by the LAN adapter.

Additional, fewer and/or other data may be stored.

Further, in one example, the adapter module updates the adapter module EPCQ index (e.g., packet completion queue entry storage block page entry index 1120) and interrupts the control program, if desired.

At initialization time, in one example, the indices in both the control program and adapter queue index areas are set to, e.g., 0. The allocation of storage block page entries to the adapter module by the control program and through the posting of inbound packets occur as follows, in one example:

- The control program issues a selected instruction, e.g., a Set Control Program Queue Controls (SCPQC) instruction, to update its data storage block page entry index (e.g., index 1020) to "N". This transfers ownership of "N" storage block page entries to the adapter module. Storage block page entries starting from the current index and the new value being set minus one (taking a ring wrap into consideration) are given to the adapter module for processing.
- For each inbound packet, e.g., Ethernet packet, the adapter module creates a packet completion queue (e.g., EPCQ) entry.
- After "N" packets or a specified timer value, the adapter module stores the packet completion queue (e.g., EPCQ) entries in control program memory and updates the adapter module packet completion queue (EPCQ) storage block page entry index (e.g., index 1120).
  - The adapter module EPCQ updates are based on the parameters defined in the queue format record information block during EQDIO initialization by the control program.
- The adapter module updates the adapter data storage block page entry index for each control program buffer which was fully packed with inbound packets, e.g., Ethernet packets. The adapter module data storage block page entry index does not, in one example, consume the partially filled control program buffer. This implies the control program is to handle the case in which a control program buffer is only partially filled, but the buffer ownership remains with the adapter module.

The adapter module determines 1740 whether the buffer is full. If the buffer is not full, then processing continues with step 1710 for the next packet. However, if the adapter module determines that the buffer is full, the adapter module updates 1750 the data SBPE index (e.g., index 1110) in the receive data plane adapter queue index (e.g., index 1100) to move to a next input buffer to start accepting packets.

Figure 18:
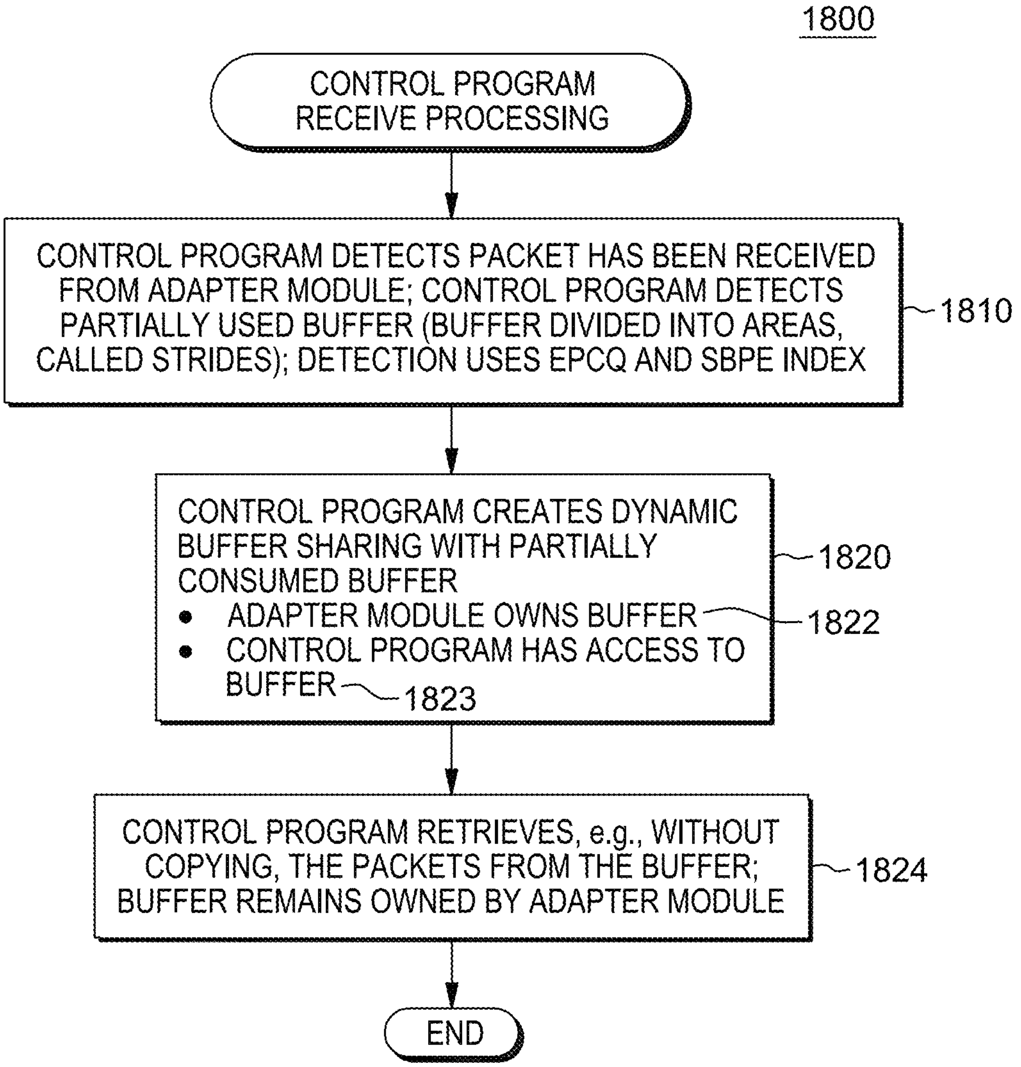
FIG. 18 depicts one example of control program receive processing of the enhanced queued direct I/O processing code of FIG. 13, in accordance with one or more aspects of the present disclosure.

One example of control program receive processing is described with reference to FIG. 18. In one example, a control program receive process 1800 (also referred to as process 1800) includes and/or uses, e.g., control program receive processing code 1320 and is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 250) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

In one example, a control program detects 1810 that a packet has been received from the adapter module and is in, e.g., a partially used buffer. That is, the buffer is divided into areas, called strides, and the control program detects that a packet transmitted by the network interface card to the control program has been received by the control program from the adapter module and placed in a selected stride. This detection is based on, e.g., an entry in, for instance, a receive data plane adapter queue index (e.g., index 1100), including, for instance, a packet completion queue entry SBPE index 1120.

Based on detecting that the packet has been received, the control program creates 1820 dynamic buffer sharing with the partially consumed buffer. That is, the control program understands that the adapter module owns 1822 the buffer but the control program has access 1823 to the buffer. The control program retrieves 1824 the packet from the buffer, although the buffer remains owned by the adapter module. In one example, the control program receives, consumes or uses the packet without copying or physically retrieving the packet. In one example, it retrieves the packet by accessing the packet and using the data in the packet. Other examples are possible.

To further describe, in one example, as the control program processes the packet completion queue entries, it uses the receive data storage block page entry index (e.g., receive data storage block page entry index 665) and the starting alignment index (e.g., starting alignment index 660) to locate the starting address of each packet (e.g., Ethernet packet). The control program can then pass the address and length (e.g., length 675) of the packet (e.g., Ethernet packet) to a specific protocol code to obtain the packet or, in another example, copy the packet out into a buffer in a specific address space. The control program also uses this information to determine the ownership of each individual receive data buffer and assign a use count for each packet (e.g., Ethernet packet) as it is processed by the specific protocol code.

In one example, it uses the receive data storage block page entry index (e.g., index 1110) in the receive data plane adapter queue index (e.g., index 1100) to determine when a receive data buffer or buffers have been returned by the adapter module to the control program.

In one or more aspects, an enhanced queued direct input/output (EQDIO) facility (executing within a computing environment, such as a central processor complex) is provided that includes a mechanism for a control program to directly and asynchronously communicate with one or more input/output devices or a network of devices by the use of data queues constructed and managed in main storage. The use of main storage queues allows the communication to be performed in a predictable and efficient manner without using the services of a centralized controlling mechanism, such as a control program input/output supervisor, and the resulting overhead such a mechanism implies.

Figure 19A:
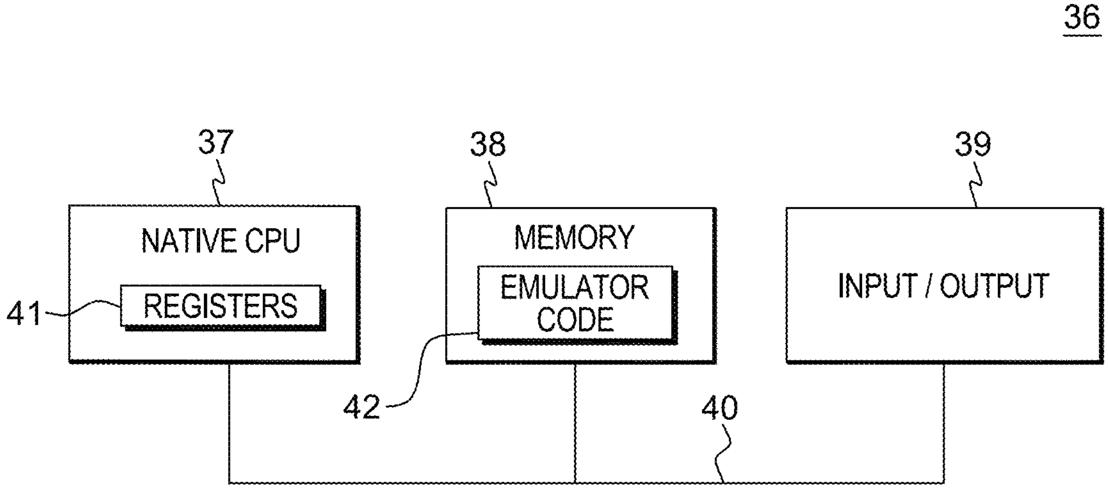
FIGS. 19A-19B depict another example of a computing environment to incorporate and use one or more aspects of the present disclosure.
Figure 19B:
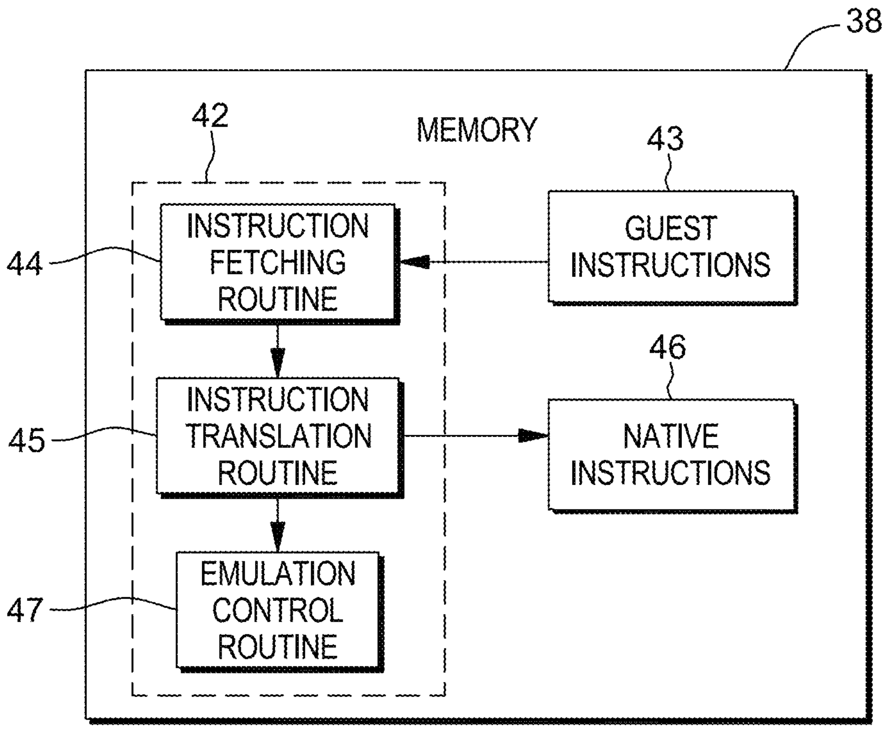

Although one or more examples of a computing environment to incorporate and use one or more aspects of the present disclosure are described herein, FIGS. 19A-19B depict another embodiment of a computing environment to incorporate and use one or more aspects of the present disclosure.

Referring, initially, to FIG. 19A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 19B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native central processing unit 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native central processing unit 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native central processing unit or by using locations in memory 38. In embodiments, guest instructions 43, native instructions 46 and emulator code 42 may reside in the same memory or may be disbursed among different memory devices.

An example instruction that may be emulated is an instruction used in EQDIO processing described herein (e.g., Set Control Program Queue Controls instruction, other instructions) and/or other EQDIO processing, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement EQDIO processing and/or to perform one or more other aspects of the present disclosure.

One or more aspects of the present disclosure are tied to computer technology and facilitate processing within a computer, improving performance thereof. For instance, communication, including the transmission of packets (e.g., data and/or control packets) between control programs and a network interface card (and the receipt of packets), is facilitated using, for instance, an adapter module.

In one or more aspects, packets are aligned, in one example, on cache line boundaries. This eliminates cache thrashing when demultiplexing buffers in the single receive data buffer. The data queue contains input data buffers assigned by the control program (e.g., host operating system) to a receive queue.

In one or more aspects, receive buffer data packing improvement is provided, in which the available (e.g., all) data space is used in each allocated receive buffer. This provides the control program (e.g., host operating system) with a packet completion queue (e.g., Ethernet packet completion queue) to be used to describe the location of each packet within the control program allocated data buffers. This avoids packet loss due to inefficient utilization of each inbound (e.g., receive) data buffer. The buffer is treated as a single entity between the control program and the adapter module.

In one or more aspects, the adapter module assigns, e.g., a 128K block (e.g., 32 4K buffers) to the network interface card. The adapter module divides a 4K input buffer into, e.g., 16 256-byte areas, called strides. The adapter module programs the network interface card to place inbound packets (e.g., inbound Ethernet packets) to start on the next cache line boundary (e.g., 256 bytes). Until the last stride is used by the adapter module, the network interface card continues to use this page. The control program (e.g., operating system) detects this partially consumed buffer. The dynamic memory sharing capability avoids data copy, in one example, and allows the control program stack to efficiently consume packets while the remaining area of the buffer is still owned by the adapter module. This shared state exists until the last stride is consumed moving the index to the next input buffer.

In one or more aspects, as packets are placed in the 128K block, the adapter module describes the packet locations in, e.g., a receive packet completion queue entry (e.g., Ethernet packet completion queue entry). Using this structure, the control program can determine when each 4K data buffer within the 128K block has been fully allocated and is available to be freed by the control program. In one example, the packet completion queue is used to map the completion (availability) of each inbound packet that arrives ready for control program consumption. The packet completion queue also enables the sharing of storage between the adapter module (e.g., hardware and/or firmware) and the control program (e.g., operating system) for 4K input buffers that are fully and partially consumed. Partially consumed input buffers are managed by control program dynamic buffer sharing.

In one or more aspects, the receive packet completion queue entry defines receive (inbound) queue information for each inbound packet received. The receive packet completion queue entry associates the packets to the control program memory defined in, e.g., the storage block page entry 4K input buffer. When a newly arrived packet or packets do not consume the entire 4K buffer, the adapter module continues to own the 4K buffer. While in this shared state, the control program is to consume the data on the partial page (e.g., avoiding copy) while recognizing the buffer is still owned and used by the adapter module. The control program recognizes this condition through the packet completion queue and/or storage block packet entry structure and dynamically shares ownership of the memory.

In one example, the packet completion queue (e.g., EPCQ) is a meta-data buffer containing the mapping information into the corresponding receive queue data buffer for each packet. This allows for demultiplexing of buffers packed into a single network receive data buffer without using a special header to be written into the data buffer.

In one or more aspects, a control program (e.g., a host) executing within a computing environment is coupled to a network interface card of the computing environment. The control program creates one or more data constructs of one or more queues to be used in communication between the control program and the network interface card. The control program transmits to an adapter module (of, e.g., a shared adapter) executing within the computing environment a queue descriptor record associated with the one or more queues to be used to establish the one or more queues within the computing environment. Communication between the control program and the network interface card uses at least one queue of the one or more queues. The control program transmits to the network interface card a packet. The transmitting uses the at least one queue of the one or more queues.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Further, other types of packets may be received. Moreover, additional, less and/or other code may be used. Although particular code may be provided as an example of performing a particular operation or task, additional and/or other code may be used. Code may be combined and/or separated into code subsets. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

executing an adapter module on a computing device of a computing environment to be used to transmit packets from a network interface card of the computing environment to a control program executing within the computing environment;

obtaining, by the adapter module executing on the computing device, packet information of a packet received at the network interface card;

generating, based on obtaining the packet information, a packet completion queue entry in a packet completion queue, the packet completion queue entry to include the packet information;

storing the packet information in the packet completion queue entry, the packet information to be used to locate a data buffer into which the packet is stored, wherein the packet information includes information to locate an entry of a receive data queue, the entry of the receive data queue including a buffer address of the data buffer into which the packet is stored, the packet completion queue and the receive data queue being part of a queue structure, the queue structure having a queue descriptor record, the queue descriptor record including an address used to locate the packet completion queue and another address used to locate the receive data queue; and providing the packet completion queue entry to the control program to be used by the control program to retrieve the packet from the data buffer.

2. The computer-implemented method of claim 1, wherein the data buffer is owned by the adapter module and is available for packet consumption by the control program, the data buffer being shared by the adapter module and the control program.

3. The computer-implemented method of claim 1, wherein the data buffer includes a plurality of strides, and wherein the data buffer continues to have packets stored therein, based on a stride of the plurality of strides being available.

4. The computer-implemented method of claim 3, wherein the data buffer is owned by the adapter module and shared by the adapter module and the control program, and wherein based on consumption of the packet in a last stride of the plurality of strides, sharing of the data buffer ceases.

5. The computer-implemented method of claim 1, wherein the packet within the data buffer is aligned on a cache line boundary.

6. The computer-implemented method of claim 1, wherein the packet completion queue corresponds to the receive data queue, and a receive queue index is used to pass ownership of entries of the receive data queue and the packet completion queue between the control program and the adapter module.

7. The computer-implemented method of claim 1, further comprising obtaining, by the adapter module, an indication that additional buffers are to be allocated.

8. The computer-implemented method of claim 7, wherein the indication is included in a data structure component accessible to the adapter module.

9. The computer-implemented method of claim 1, further comprising obtaining by the adapter module an indication that the control program retrieved the packet from the data buffer.

10. The computer-implemented method of claim 1, further comprising signaling by the adapter module to the control program arrival of the packet in the data buffer.

11. A computer system comprising:

at least one computing device;

a set of one or more computer-readable storage media; and program instructions, collectively stored in the set of one or more computer-readable storage media, for causing the at least one computing device to perform computer operations including:

executing an adapter module on a computing device, the adapter module to be used to transmit packets from a network interface card to a control program executing within the computer system;

obtaining, by the adapter module executing on the computing device, packet information of a packet received at the network interface card;

generating, based on obtaining the packet information, a packet completion queue entry in a packet completion queue, the packet completion queue entry to include the packet information;

storing the packet information in the packet completion queue entry, the packet information to be used to locate a data buffer into which the packet is stored, wherein the packet information includes information to locate an entry of a receive data queue, the entry of the receive data queue including a buffer address of the data buffer into which the packet is stored, the packet completion queue and the receive data queue being part of a queue structure, the queue structure having a queue descriptor record, the queue descriptor record including an address used to locate the packet completion queue and another address used to locate the receive data queue; and providing the packet completion queue entry to the control program to be used by the control program to retrieve the packet from the data buffer.

12. The computer system of claim 11, wherein the data buffer includes a plurality of strides, and wherein the data buffer continues to have packets stored therein, based on a stride of the plurality of strides being available.

13. The computer system of claim 12, wherein the data buffer is owned by the adapter module and shared by the adapter module and the control program, and wherein based on consumption of the packet in a last stride of the plurality of strides, sharing of the data buffer ceases.

14. The computer system of claim 11, wherein the packet completion queue corresponds to the receive data queue, and a receive queue index is used to pass ownership of entries of the receive data queue and the packet completion queue between the control program and the adapter module.

15. The computer system of claim 11, wherein the computer operations further comprise obtaining by the adapter module an indication that the control program retrieved the packet from the data buffer.

16. The computer system of claim 11, wherein the computer operations further comprise signaling by the adapter module to the control program arrival of the packet in the data buffer.

17. A computer program product comprising:

a set of one or more computer-readable storage media; and program instructions, collectively stored in the set of one or more computer-readable storage media, for causing at least one computing device to perform computer operations including:

executing an adapter module on a computing device of a computing environment to be used to transmit packets from a network interface card of the computing environment to a control program executing within the computing environment;

obtaining, by the adapter module executing on the computing device, packet information of a packet received at the network interface card;

generating, based on obtaining the packet information, a packet completion queue entry in a packet completion queue, the packet completion queue entry to include the packet information;

storing the packet information in the packet completion queue entry, the packet information to be used to locate a data buffer into which the packet is stored, wherein the packet information includes information to locate an entry of a receive data queue, the entry of the receive data queue including a buffer address of the data buffer into which the packet is stored, the packet completion queue and the receive da ta queue being part of a structure, the queue structure having a queue descriptor record, the queue descriptor record including an address used to locate the packet completion queue and another address used to locate the receive data queue; and providing the packet completion queue entry to the control program to be used by the control program to retrieve the packet from the data buffer.

18. The computer-program product of claim 17, wherein the data buffer includes a plurality of strides, and wherein the data buffer continues to have packets stored therein, based on a stride of the plurality of strides being available.

19. The computer-program product of claim 18, wherein the data buffer is owned by the adapter module and shared by the adapter module and the control program, and wherein based on consumption of the packet in a last stride of the plurality of strides, sharing of the data buffer ceases.

20. The computer-program product of claim 17, wherein the packet completion queue corresponds to the receive data queue, and a receive queue index is used to pass ownership of entries of the receive data queue and the packet completion queue between the control program and the adapter module.

21. The computer-program product of claim 17, wherein the computer operations further comprise obtaining by the adapter module an indication that the control program retrieved the packet from the data buffer.

22. The computer-program product of claim 17, wherein the computer operations further comprise signaling by the adapter module to the control program arrival of the packet in the data buffer.

23. A computer-implemented method comprising:

executing a control program on a computing device of a computing environment, the control program to receive packets transmitted from a network interface card of the computing environment;

obtaining, by the control program, packet information from a packet completion queue entry of a packet completion queue, the packet completion queue entry generated by an adapter module executing within the computing environment and the packet information to be used to locate a data buffer into which the packet is stored by the network interface card, wherein the packet information includes information to locate an entry of a receive data queue, the entry of the receive data queue including a buffer address of the data buffer into which the packet is stored, the packet completion queue and the receive data queue being part of a queue structure, the queue structure having a queue descriptor record, the queue descriptor record including an address used to locate the packet completion queue and another address used to locate the receive data queue; and receiving, by the control program, the packet transmitted from the network interface card, the receiving including locating the packet in the data buffer using the packet information and consuming the packet from the data buffer.

24. The computer-implemented method of claim 23, wherein the packet information includes a starting alignment index and a receive data storage block page entry index, the starting alignment index specifying a starting location within the data buffer corresponding to the receive data storage block page entry index.

25. A computer program product comprising:

a set of one or more computer-readable storage media; and program instructions, collectively stored in the set of one or more computer-readable storage media, for causing at least one computing device to perform computer operations including:

executing a control program on a computing device of a computing environment, the control program to receive packets transmitted from a network interface card of the computing environment;

obtaining, by the control program, packet information from a packet completion queue entry of a packet completion queue, the packet completion queue entry generated by an adapter module executing within the computing environment and the packet information to be used to locate a data buffer into which the packet is stored by the network interface card, wherein the packet information includes information to locate an entry of a receive data queue, the entry of the receive data queue including a buffer address of the data buffer into which the packet is stored, the packet completion queue and the receive data queue being part of a queue structure, the queue structure having a queue descriptor record, the queue descriptor record including an address used to locate the packet completion queue and another address used to locate the receive data queue; and receiving, by the control program, the packet transmitted from the network interface card, the receiving including locating the packet in the data buffer using the packet information and consuming the packet from the data buffer.

* * * * *